(12) United States Patent
Remez et al.

(10) Patent No.: US 8,334,808 B2
(45) Date of Patent: Dec. 18, 2012

(54) DIRECTION FINDING ANTENNA SYSTEM AND METHOD

(75) Inventors: Jacob Remez, Haifa (IL); Erez Ben-Ari, Rishon Le Zion (IL)

(73) Assignee: Technion Research and Development Foundation Ltd., Haifa (IL)

( * ) Notice: Subject to any disclaimer, the term of this patent is extended or adjusted under 35 U.S.C. 154(b) by 319 days.

(21) Appl. No.: 12/797,681

(22) Filed: Jun. 10, 2010

(65) Prior Publication Data

US 2011/0304508 A1 Dec. 15, 2011

(51) Int. Cl.
  G01S 3/14 (2006.01)
  G01S 5/04 (2006.01)
(52) U.S. Cl. ...................... 342/432; 342/442
(58) Field of Classification Search .................. 342/432, 342/442, 427; 343/774
  See application file for complete search history.

(56) References Cited

U.S. PATENT DOCUMENTS

| | | | |
|---|---|---|---|
| 2,954,558 A | 9/1960 | Honey et al. | |
| 3,568,203 A | 3/1971 | Venters et al. | |
| 5,767,814 A * | 6/1998 | Conroy et al. | 343/774 |
| 6,104,346 A * | 8/2000 | Rudish et al. | 342/424 |
| 6,593,892 B2 * | 7/2003 | Honda et al. | 343/773 |
| 7,427,953 B2 | 9/2008 | Chiang et al. | |

OTHER PUBLICATIONS

Jacob Remez and Erez Ben-Ari; "Low-Loss Wideband Multimodal Interferometric Antenna for DOA in Azimuth and Elevation" IEEE Antennas and Wireless Propagation Letters, vol. 8, pp. 898-902 (2009).

* cited by examiner

Primary Examiner — Gregory C Issing
(74) Attorney, Agent, or Firm — The Law Office of Michael E. Kondoudis

(57) ABSTRACT

An antenna system for estimating the DOA of arriving signals, comprising: a first omnidirectional antenna; and a second omnidirectional antenna, which is located coaxially above the first omnidirectional antenna at a predefined distance D. The first omnidirectional antenna is configured to transform the received arriving signal into output signals, and the second omnidirectional antenna is configured to transform the received signal into a reference signal. The antenna system allows extracting: a first phase difference between the phase of the first output signal and the reference phase and a second phase difference between the phase of the second output signal and the reference phase, where each phase difference includes a first component proportional to the azimuth of said arriving signal and a second component corresponding to the elevation of the arriving signal, from which the azimuth and the elevation of the arriving signal can be extracted.

40 Claims, 11 Drawing Sheets

DIRECTION FINDING ANTENNA SYSTEM AND METHOD

TECHNICAL FIELD

The present invention relates generally to the field of direction finding of wireless signals and more particularly to systems and methods for finding direction of arrival of wireless signals using antenna systems.

BACKGROUND ART

Antenna systems for direction finding (DF) or direction-of-arrival (DOA) of wireless signals such as RF (radio frequency) or microwave signals usually require finding an azimuth and an elevation of the arriving signals.

Antenna systems usually estimate each property (azimuth angle or elevation angle) separately requiring a complicated and usually expensive constructions and designs to achieve high level and accurate estimations of azimuth and elevation.

Most systems use two different sub systems to estimate each property of the arriving signal separately. One commonly known method is to use two multimodal antennas wherein one antenna is used to estimate the azimuth of the arriving signal and the two multimodal antennas are used to estimate the elevation, using interferometry techniques. In these methods, each of multimodal antennas produces at least two modes: a zero mode and a first-order phase mode allowing extracting the azimuth using one of the antennas and the elevation using the other antenna. The azimuth and elevation are extracted separately using two separate techniques: a multimodal technique is used for extracting the azimuth and an interferometry technique is used for extracting the elevation.

U.S. Pat. No. 7,427,953, which is incorporated herein by reference in its entirety, discloses an antenna system for determining the DOA of received signals, where the system includes two antenna arrays, each having a plurality of antenna elements, two first stage multi-mode-port matrices, at least one second stage multi-mode-port matrix, an azimuth phase detector, an elevation amplitude detector, a plurality of phase shifters and a transceiver. The antenna arrays and the first stage multi-mode-port matrices form a plurality of orthogonal omnidirectional modes. Each of the phase modes has a characteristic phase set. Two of the modes' phases are used to determine DOA in azimuth. The second stage multi-mode-port matrix forms a sum-mode and a difference-mode used to determine the elevation of the received signals. The sum and difference method is an alternative method to find the elevation by comparing amplitudes instead of comparing phases as required in interferometry. The second antenna may also include a multimodal omnidirectional antenna so the two equal antennas are utilized to shape a radiation pattern of low side-lobes of the transmitted signal in the direction characterized by the measured elevation and azimuth.

U.S. Pat. No. 3,568,203, which is incorporated herein by reference in its entirety, discloses a DF antenna assembly comprising a horn antenna structure and associated microwave circuitry capable of determining the azimuth of a received signal. The assembly enables producing signals at output ports of a hybrid circuit that change in phase as a linear function of the azimuth angle of the arriving signal, where a comparison of these signals with a reference mode enables determining the azimuth angle of arrival of the signal received at the antenna. The elevation is found separately by a second antenna that is perpendicular to the horizon plane, wherein the second antenna comprises a linear array of at least two omnidirectional antenna elements (dipoles), and the elevation is found by the interferometry technique by measuring the phase difference between two dipoles of the second antenna.

U.S. Pat. No. 2,954,558, which is incorporated herein by reference in its entirety, discloses an antenna system comprising a single biconical radiator and microwave energy propagating means that allow extracting the azimuth of arriving signals regardless of their elevation by enabling to produce only TEM and $TE_{10}$ radial-line modes responsive of the energy from the arriving signals, wherein the radial-line modes are transformed to TEM and $TE_{11}$ coaxial-line modes. The TEM and $TE_{11}$ modes are propagated through four rectangular waveguides and waveguide transition means, where the TEM mode establishes equal signals in phase and amplitude through the waveguides and the $TE_{11}$ mode establishes respective oppositely phased signals, where the azimuth of the arriving signals is extracted from the phase difference between the TEM and $TE_{11}$ modes.

All of the above mentioned patents and patent applications disclose systems and assemblies that only allow extracting of the azimuth independently of the elevation of an arriving signal, whereas another process and measuring and more hardware is required to measure the elevation of the arriving signal. The additional process may require a different arrangement of the system only enabling a separate process for determining the elevation of the arriving signal.

SUMMARY OF INVENTION

According to some embodiments of the invention, there is provided an antenna system for estimating the direction of arrival (DOA) of an arriving signal, wherein the arriving signal arrives substantially from the horizon within a predefined range of elevations below and above the horizon. The antenna system may comprise: a first omnidirectional antenna; and a second omnidirectional antenna, which is located coaxially above or below the first omnidirectional antenna and separated therefrom at a predefined distance D, wherein the first omnidirectional antenna is configured to receive the arriving signal and transform the received signal into at least two output signals: a first output signal and a second output signal wherein the phases of the output signals are proportional to the azimuth angle of the arriving signal and correspond to the elevation of the arriving signal and to the distance D between the two antennas, and the second omnidirectional antenna is configured to receive the arriving signal and transform the received signal into a reference signal of a reference phase, which has a zero phase-slope, meaning that the reference signal phase is a constant phase independent of the azimuth angle of the arriving signal.

According to some embodiments of the invention, the phases of first and second output signals are shifted from the reference phase by a phase shift that depends upon the elevation direction of the arriving signal, corresponding to the distance D between the first and second omnidirectional antennas.

The antenna system may further be configured to allow extracting at least two phase differences: a first phase difference $\Delta_1$ between the phase of the first output signal and the reference phase and a second phase difference $\Delta_2$ between the phase of the second output signal and the reference phase, wherein each phase difference includes a first phase component proportional to the azimuth angle of the arriving signal and a second component corresponding to the elevation of the arriving signal.

According to some embodiments, the antenna system may further be configured to enable extracting the azimuth and the elevation of the arriving signal from the extracted phase differences.

According to other embodiments of the invention, there is provided a method of estimating the direction of arrival (DOA) of an arriving signal, using an antenna system comprising a first omnidirectional antenna and a second omnidirectional antenna. The method may comprise: receiving an arriving signal, wherein the first omnidirectional antenna receives the arriving signal; transforming the received signal into at least two output signals: a first output signal and a second output signal, wherein the phases of the at least two output signals correspond to the azimuth and elevation angles of the arriving signal and the transformation is carried out by the first omnidirectional antenna, which is located coaxially below or above the second omnidirectional antenna and separated therefrom at a predefined distance D; receiving the same arriving signal, by the second omnidirectional antenna; transforming the signal received by the second omnidirectional antenna into a reference signal of a reference phase; outputting a first phase difference $\Delta_1$ between the phase of the first output signal and the phase of the reference signal and a second phase difference $\Delta_2$ between the phase of the second output signal and the phase of the reference signal, wherein each phase difference includes a first phase component proportional to the azimuth angle of the arriving signal and a second component corresponding to the elevation of the arriving signal; and estimating the azimuth and elevation of the arriving signal using the phase differences $\Delta_1$ and $\Delta_2$. The method involves simple algebraic operations for extracting the first and second phase components from the measured phase differences $\Delta_1$ and $\Delta_2$.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without limiting the scope of the present invention.

The present invention, according to some embodiments thereof, relates to a novel antenna system and a novel method for estimating direction of arrival (DOA) of arriving signals.

The antenna system may be configured to find DOA of wireless arriving signals of various types such as: microwave wireless signals, RF (radio frequency) wireless signals, or acoustic signals of one or more frequency ranges. The arriving signals are for example: electromagnetic waves propagating in free space or in open space, or sound waves propagating in air or water, et cetera. The medium through which the waves propagate may include materials and objects that my change the direction of propagation of the waves and the antenna system may find DOA of waves arriving directly from the source, or waves reflected by objects and materials in the path of propagation.

According to some embodiments, the antenna system may comprise a first omnidirectional antenna; and a second omnidirectional antenna, which is located coaxially above or below the first omnidirectional antenna and separated therefrom at a predefined distance D. The first omnidirectional antenna may be configured to receive an arriving signal that arrives substantially from the horizon within a predefined range of elevations below and above the horizon and transform the received signal into at least two output signals: a first output signal and a second output signal, where the phases of the output signals are proportional to the azimuth angle and also dependent upon the elevation direction of the arriving signal. The second omnidirectional antenna may be configured to receive the arriving signal and transform the received signal into a reference signal of a reference phase such as phase zero, where the antenna system may be further configured to enable extracting a first phase difference $\Delta_1$ between phase of the first output signal and the phase of the reference signal and a second phase difference $\Delta_2$ between the phase of the second output signal and the phase of the reference signal, wherein each phase difference includes a first phase component proportional to the azimuth angle of the arriving signal and a second phase component corresponding to the elevation direction of the arriving signal. These phase components may be extracted from the phase differences $\Delta_1$ and $\Delta_2$ using simple algebraic operations. The antenna system may be further configured to enable extracting the azimuth and the elevation angles of the arriving signal from the outputted phase differences $\Delta_1$ and $\Delta_2$.

Figure 1:
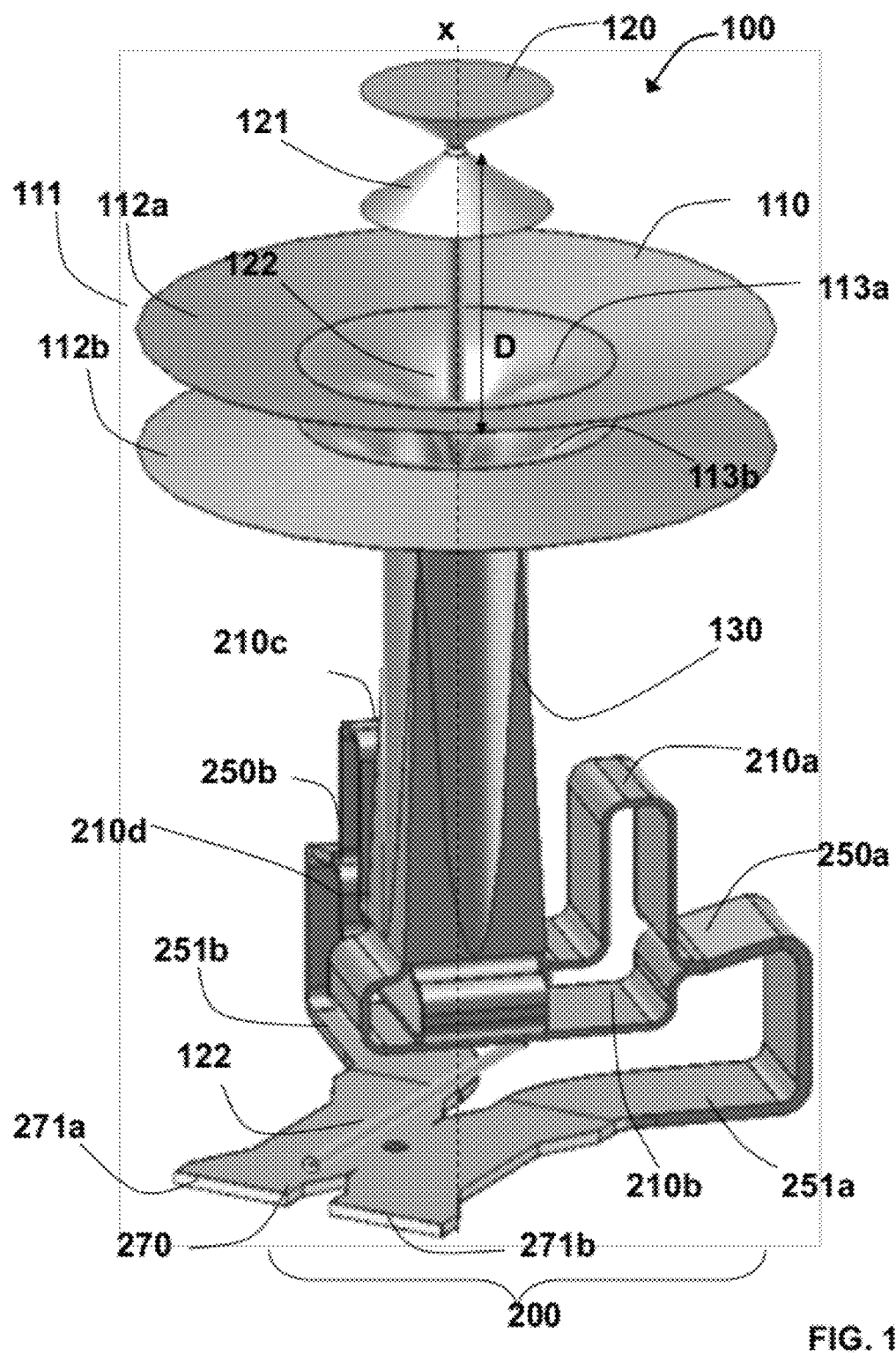
FIG. 1 shows an antenna system, for finding direction-of-arrival of arriving signals, according to some embodiments of the invention.
Figure 2:
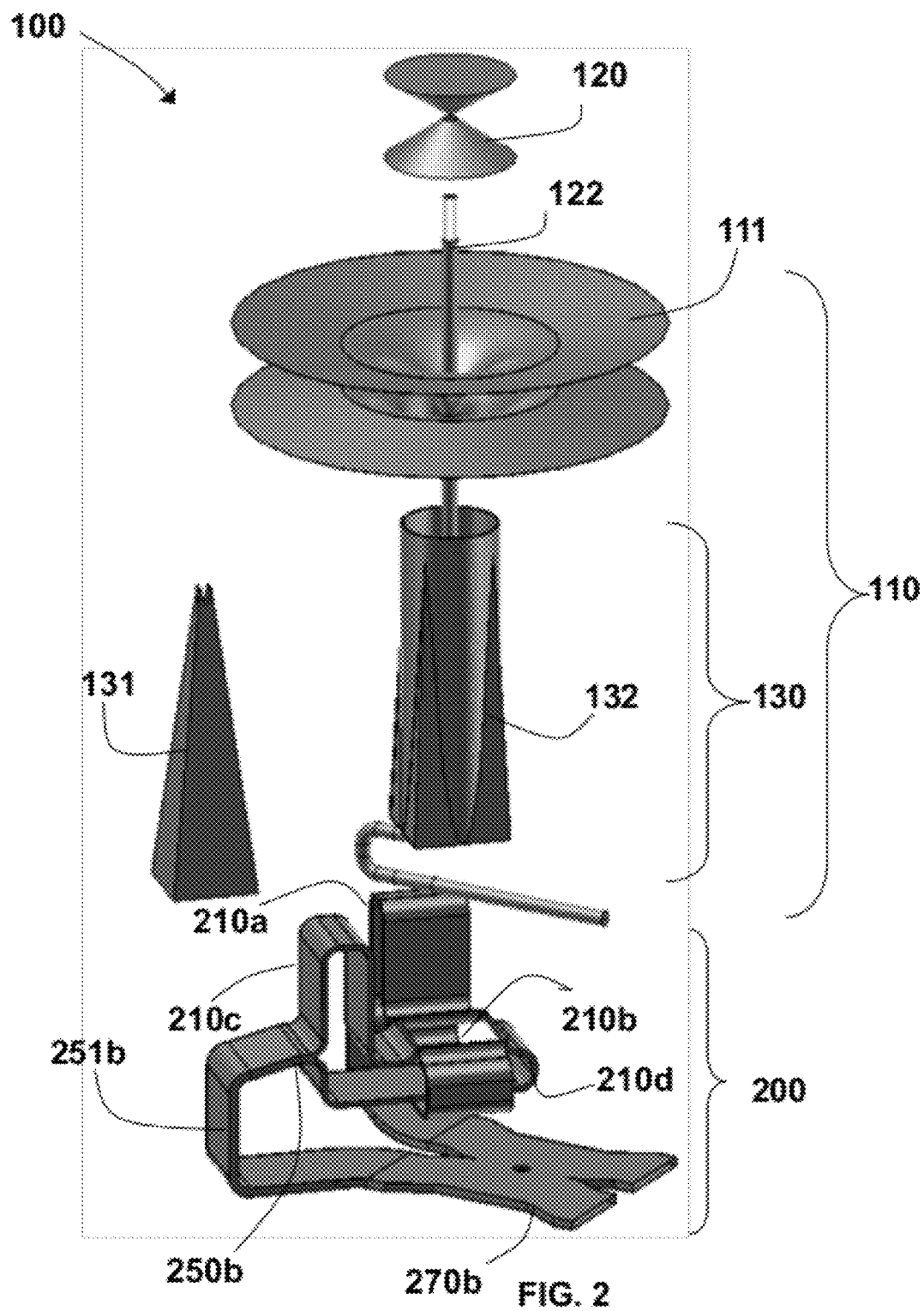
FIG. 2 is an exploded view that shows the antenna system, for finding direction-of-arrival of arriving signals, according to some embodiments of the invention.
Figure 3:
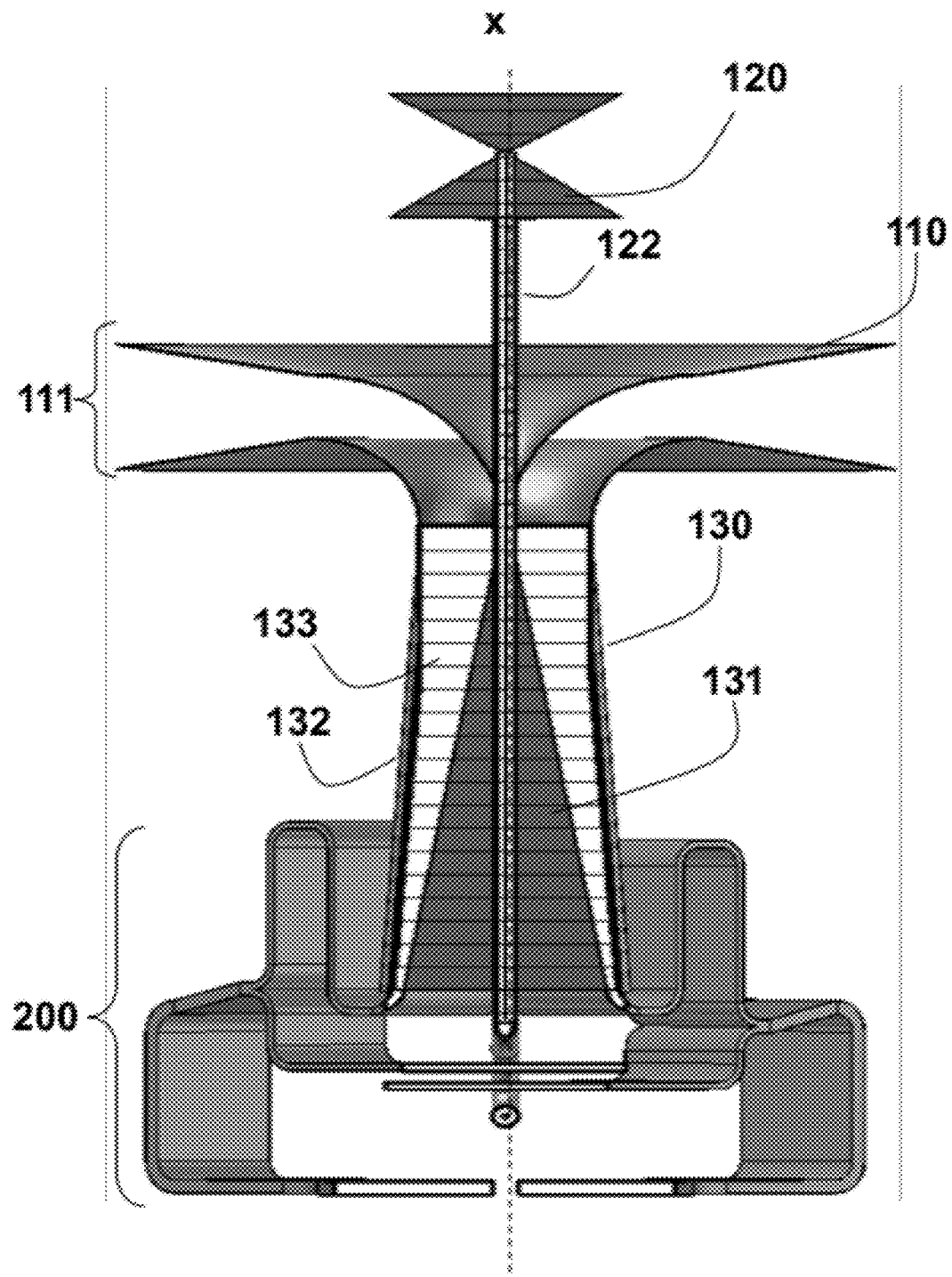
FIG. 3 is a cross-sectional view that shows the antenna system, for finding direction-of-arrival of arriving signals, according to some embodiments of the invention.

Reference is now made to FIGS. 1-3, which schematically illustrate an antenna system 100, for finding DOA of an arriving signal, according to some embodiments of the invention.

As shown in FIGS. 1-3, antenna system 100 may comprise: a first omnidirectional antenna 110; a second omnidirectional antenna 120; and a feed assembly 200.

First omnidirectional antenna 110 is located coaxially below second omnidirectional antenna 120 at a predefined vertical distance "D", about a predefined axis "x".

According to some embodiments of the invention, as illustrated in FIGS. 1-3, first omnidirectional antenna 110 may comprise a biconical horn omnidirectional antenna 111 and a circular waveguide (CWG) 130. First omnidirectional antenna 110 may be configured to receive an arriving signal of an azimuth 0, and transform the arriving signal into two output signals of opposite phase slopes: a first output signal of a positive phase-slope and a second output signal of a negative-phase slope, where the phases of the output signals are proportional to the azimuth angle $\phi$ with positive first-order phase-slope (+1) and negative first-order phase-slope (−1), and the output signal phases are also dependent upon the elevation direction of the arriving signal.

CWG 130 may be configured to guide the $TE_{11}$ circular waveguide mode generated from the electromagnetic field received in first omnidirectional antenna 110. The diameter of the CWG is configured to filter out propagation of higher modes.

According to some embodiments, as illustrated in FIGS. 1-3, second omnidirectional antenna 120 may comprise a biconical dipole omnidirectional antenna 121 and a guiding member 122 (such as a coaxial cable or a balanced line), where biconical dipole omnidirectional antenna 121 is configured to transform the received signal into a reference signal and the guiding member 122 is configured to guide the reference signal received from the biconical dipole antenna 121.

According to some embodiments, a part of guiding member 122 may be inserted through upper waveguide funnel portion 113a of biconical horn omnidirectional antenna 111 and through CWG 130.

Figure 4A:
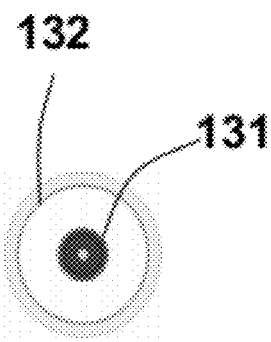
FIG. 4A shows a cross-sectional view of an upper part of a circular waveguide (CWG) of the antenna system.
Figure 4B:
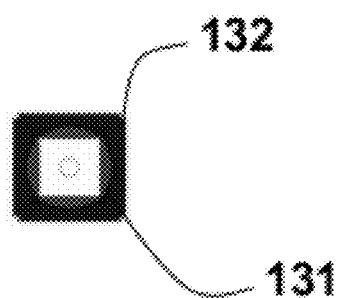
FIG. 4B shows a cross-sectional view of a middle part of the CWG transition of the antenna system.
Figure 4C:
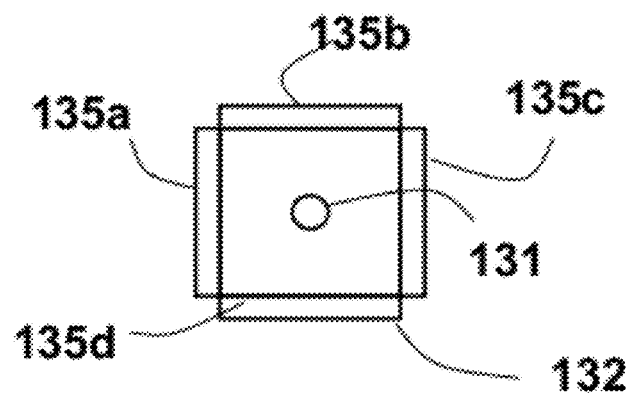
FIG. 4C shows a cross-sectional view of a lower part of the CWG transition of the antenna system.

As illustrated in FIGS. 1-3, CWG 130 may include a rectangular pyramid 131 and a housing 132 enveloping rectangular pyramid 131 creating four separated rectangular outputs 135a, 135b, 135c, 135d shown in FIG. 4C, where the space created between pyramid 131 and housing 132 may create an empty cavity 133 which may be filled with air. The guiding member 122 is also inserted through the pyramid 131.

According to some embodiments, CWG pyramid 131 and/or housing 132 may be made from one or more types of conductive (e.g. metallic) materials, or may be coated with a conductive metal.

FIG. 4A schematically illustrates a cross sectional view of an upper part of CWG 130, where the cross-sectional perimeter of pyramid 131 is circular and the cross-sectional perimeter of housing 132 is also circular.

FIG. 4B schematically illustrates a cross sectional view of a middle part of CWG 130, where the cross-sectional perimeter of pyramid 131 is a square and the cross-sectional perimeter of housing 132 is also square.

FIG. 4C schematically illustrates a cross sectional view of a lower part of CWG 130, where the cross-sectional perimeter of pyramid 131 is square and the cross-sectional perimeter of housing 132 includes four rectangular outputs: 135a, 135b, 135c and 135d, where each pair of opposite outputs such as 135a and 135c or 135b and 135d output a corresponding component of the received field. For example, each of outputs 135a and 135c outputs a signal corresponding to a field component parallel to a straight line connecting outputs 135a and 135c, and each of outputs 135b and 135d outputs a signal corresponding to a field component parallel to a straight line connecting outputs 135b and 135d while guiding member 122 outputs the reference signal corresponding to the reference zero-mode "0".

The dimensions of CWG 130 correspond to the desired range of frequencies of the received signals and other compacting considerations.

According to some embodiments, as illustrated in FIGS. 1-3, biconical horn antenna 111 of first omnidirectional antenna 110 may include two parallel plates: an upper plate 112a and a lower plate 112b, where upper plate 112a is coaxially located above lower plate 112b, and where upper plate 112a comprises an upper waveguide funnel portion 113a and lower plate 112b comprises a lower waveguide funnel portion 113b. The maximal diameter of the rim of upper plate 112a is substantially equal to the maximal diameter of the rim of lower plate 112b, where the maximal diameter of each plate is taken from one edge of the rim to another.

According to some embodiments, as illustrated in FIGS. 1-3, antenna system 100 may further comprise a feed assembly 200 operatively connected to rectangular outputs 135a, 135b, 135c and 135d of CWG 130, where feed assembly 200 is configured to enable extracting the phase differences $\Delta_1$ and $\Delta_2$ by outputting two signals of opposite phase directions: "+1" and "−1". Therefore an interferometry assembly or any other kind of a system or device may be used to extract the phase differences $\Delta_1$ and $\Delta_2$ by subtracting the phase of first signal "+1" from the phase of the reference signal "0" and the phase of the second signal "−1" from the phase of the reference signal "0".

In a case where the first and second signals of omnidirectional antenna 110 are two first-order signals of opposite phase slopes the first phase difference $\Delta_1$ is proportional to: $(\phi+\beta)$ wherein $\phi$ is proportional to the azimuth of the arriving signal and $\beta$ is the elevation contribution of the arriving signal, which corresponds to the elevation angle and the distance "D" between first omnidirectional antenna 110 and second omnidirectional antenna 120, and the second phase difference $\Delta_2$ is proportional to $(-\phi+\beta)$, where the elevation contribution $\beta_{DOA}$ is extracted by the calculation of:

$$\beta_{DOA} = \tfrac{1}{2} \times (\Delta_1 + \Delta_2)$$

and once the elevation contribution $\beta_{DOA}$ is extracted, the azimuth $\phi_{DOA}$ is extracted by one of the calculations of:

$$\phi_{DOA} = (\Delta_1 - \beta_{DOA});$$

$$\phi_{DOA} = -(\Delta_2 - \beta_{DOA}),$$

wherein $\beta_{DOA}$ and $\phi_{DOA}$ are extracted values based on measured values $\Delta_1$ and $\Delta_2$, that may contain measurement errors.

The output signals of first omnidirectional antenna 110 may include at least two of: first-order output signal of a positive phase slope (+1), first-order output signal of a negative phase slope (−1), second-order output signal of a positive phase-slope (+2), and/or second-order output signal of a negative phase-slope (−2), wherein at least two of the outputted signals are of the same order and at least one of the outputted signals is of the first order.

The first case described previously was of two output signals (+1) and (−1). The other cases of three or four output signals automatically fulfill the condition of two output signals of the same order and at least one is of the first order. Thus for all other cases we can define that we require at least three output signals from the four signals mentioned above. Two signals of the same order are required to extract the elevation contribution of the mode, and the first-order signal is required to extract the azimuth without ambiguity.

The output signals taken for extracting $\Delta_1$ and $\Delta_2$ may be, for example, one of the following combinations: (+1) and (−1); (+1), (−2) and (+2); (−1), (−2) and (+2); (+1), (−1) and (+2); (+1), (−1) and (−2); (+1), (−1), (−2) and (+2). Using only two output signals for extracting $\Delta_1$ and $\Delta_2$ may only be possible when using the two first-order modes of (+1) and (−1).

According to some embodiments, as illustrated in FIGS. 1-3, feed assembly 200 may be a rectangular waveguide feed assembly comprising:

a first set of four rectangular waveguides 210a, 210b, 210c and 210d of equal length;

two E-plane power combiners: a first E-plane combiner 250a and a second E-plane combiner 250b, each of combiners 250a and 250b has two inputs and one output; and a second set of two rectangular waveguides 251a and 251b of equal length;

and a quadrature hybrid coupler 270, wherein rectangular waveguides 210a and 210b operatively connect the first pair of opposing rectangular outputs 135a and 135c of CWG 130 to the two inputs of first E-plane combiner 250a and the other pair of rectangular waveguides 210c and 210d operatively connect the second pair of opposing rectangular outputs 135b and 135d to the two inputs of second E-plane combiner 250b.

According to embodiments, E-Plane combiner 250a connects to one input of coupler 270 and E-Plane combiner 250b connects to another input of coupler 270 by second pair of equal length rectangular waveguides 251a and 251b respectively.

Hybrid coupler 270 may be, for example, one of: side-wall hybrid coupler; top-wall hybrid coupler, or any other coupler known in the art.

According to some embodiments, hybrid coupler 270 may comprise two output ports: a first port 271a and a second port 271b, wherein first port 271a provides a first output signal of a first phase that includes two phase components: a first phase component proportional to the azimuth angle of said arriving signal and a second phase component corresponding to the elevation direction of the arriving signal, wherein the phase of the first output signal is used to extract the first phase difference $\Delta_1$, and second port 271b provides a second output signal of a second phase that also includes two components: a first phase component proportional to the azimuth angle of the arriving signal and a second phase component corresponding to the elevation of the arriving signal, wherein the phase of the second output signal is used to extract the second phase difference $\Delta_2$.

First output signal is referred to as a first phase mode of "+1" and second output signal is referred to as a second phase mode of "−1" phase-slope and reference signal may be referred to as zero phase mode of "0" phase-slope. Ports 271a and 271b and output port of guiding member 122 may be used for extracting the "+1" "−1" and "0" phase modes to allow extracting the phases differences $\Delta_1$ and $\Delta_2$ therefrom.

Each E-plane combiner 250a and 250b enables summing up the energy from a pair of rectangular waveguides, where each combiner enables extracting the $TE_{11}$ mode component from the signal that arrived from the antenna into the CWG, and excluding the TEM mode that naturally arises in the CWG. Hybrid Coupler 270 enables suspending one of the $TE_{11}$ modes and creating a 90 degrees phase delay between the two $TE_{11}$ modes outputted by combiners 250a and 250b, where output ports 271a and 271b of coupler 270 output two modes of opposite phase slopes.

Biconical dipole antenna 121, biconical horn antenna 111, CWG 130 and feed assembly 200 are of dimensions corresponding to the desired frequency range of the arriving signals desired to be received and analyzed.

For a frequency range of wavelengths range: $\lambda_{fmax} < \lambda < \lambda_{fmin}$, wherein $\lambda_{fc}$ represents the wavelength of the center of frequency:

the width of each rectangular waveguide may be $a > \lambda_{fmin}/2$ and the height of each rectangular waveguide may be $b < a/2$;

the distance $H_1$ between the lower end of biconical dipole antenna 121 and the upper end of biconical dipole antenna 121 may be: $H_1 = \lambda_{fmin}/2$;

the diameter $d_1$ of each plate of biconical antenna 121 may be: $d_1 = \lambda_{fc}$;

the distance $H_2$ between the lower end of biconical horn antenna 111 and the upper end of biconical horn antenna 111 may be: $H_2 = \lambda_{fmin}/2$;

the diameter $d_2$ of each plate of biconical horn antenna (112a and 112b) may be $d_2 = 2\frac{1}{2} \times \lambda_{min}$, and the distance $H_3$ between the center of biconical dipole antenna 121 and the center of biconical horn antenna 111 may be $H_3 = \lambda_{fmin}$.

Feed assembly 200 may be based upon at least one of: rectangular waveguide technology, coaxial waveguide technology, stripline waveguide technology, microstrip waveguide technology, coplanar waveguide technology, slotline waveguide technology, or any other technology known in the art.

Antenna system 100 may be configured to find DOA of wireless arriving signals of various types such as: microwave wireless signals, RF (radio frequency) wireless signals, or acoustic signals of one or more frequency ranges.

Figure 5:
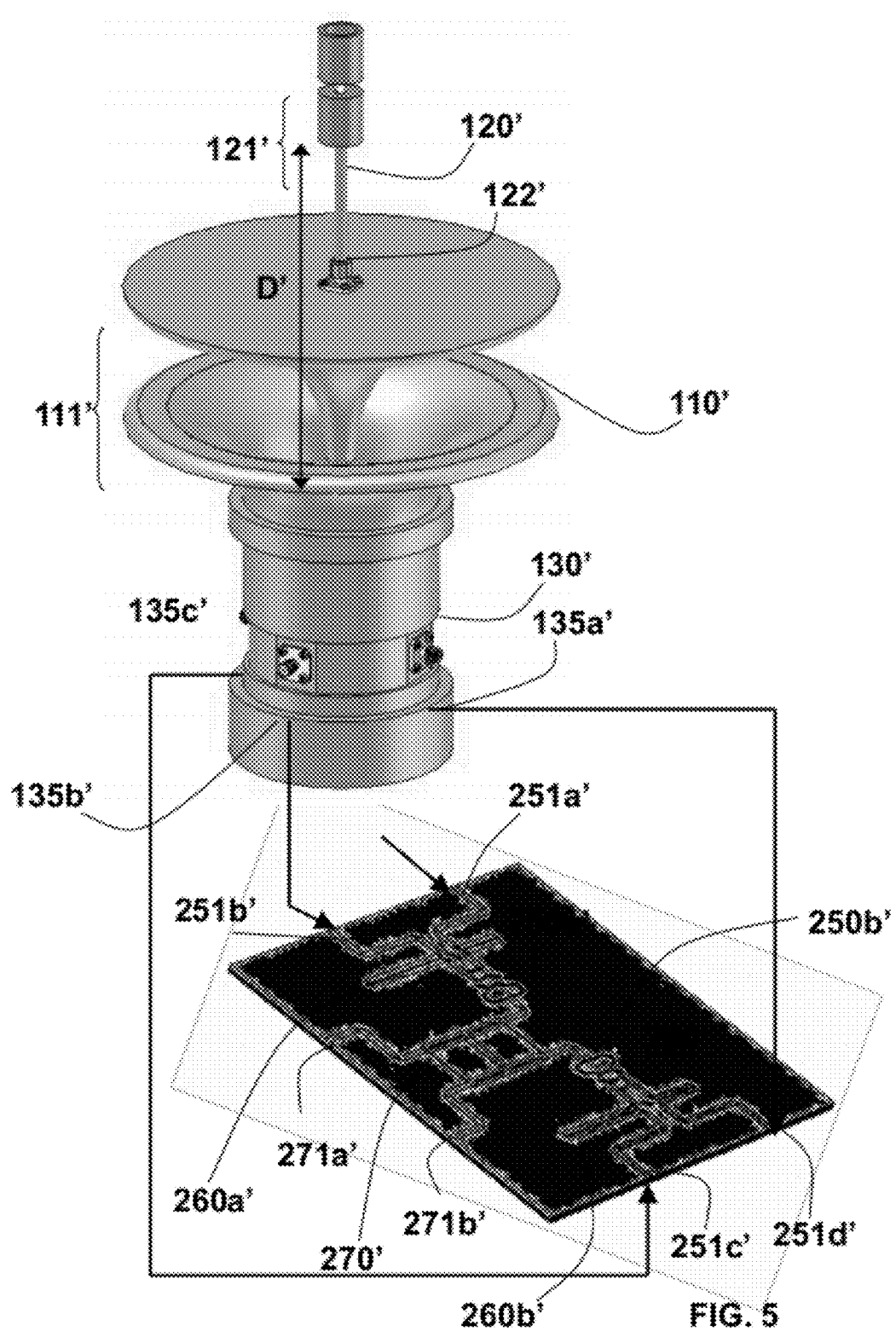
FIG. 5 shows an antenna system for finding direction-of-arrival of arriving signals, according to other embodiments of the invention.
Figure 6:
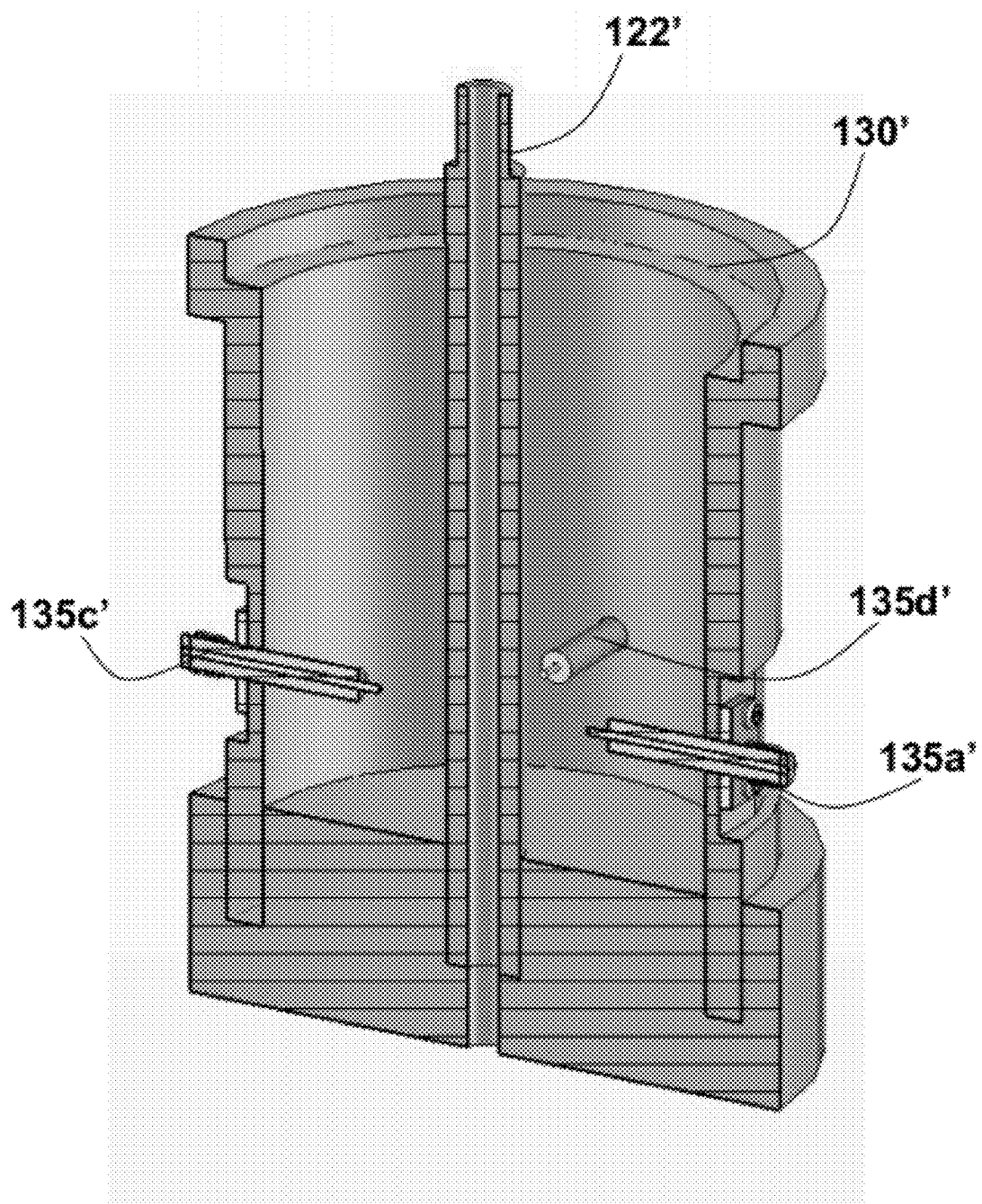
FIG. 6 shows a cross-sectional view of part of the CWG of the antenna system illustrated in FIG. 5, according to some embodiments of the invention.
Figure 7:
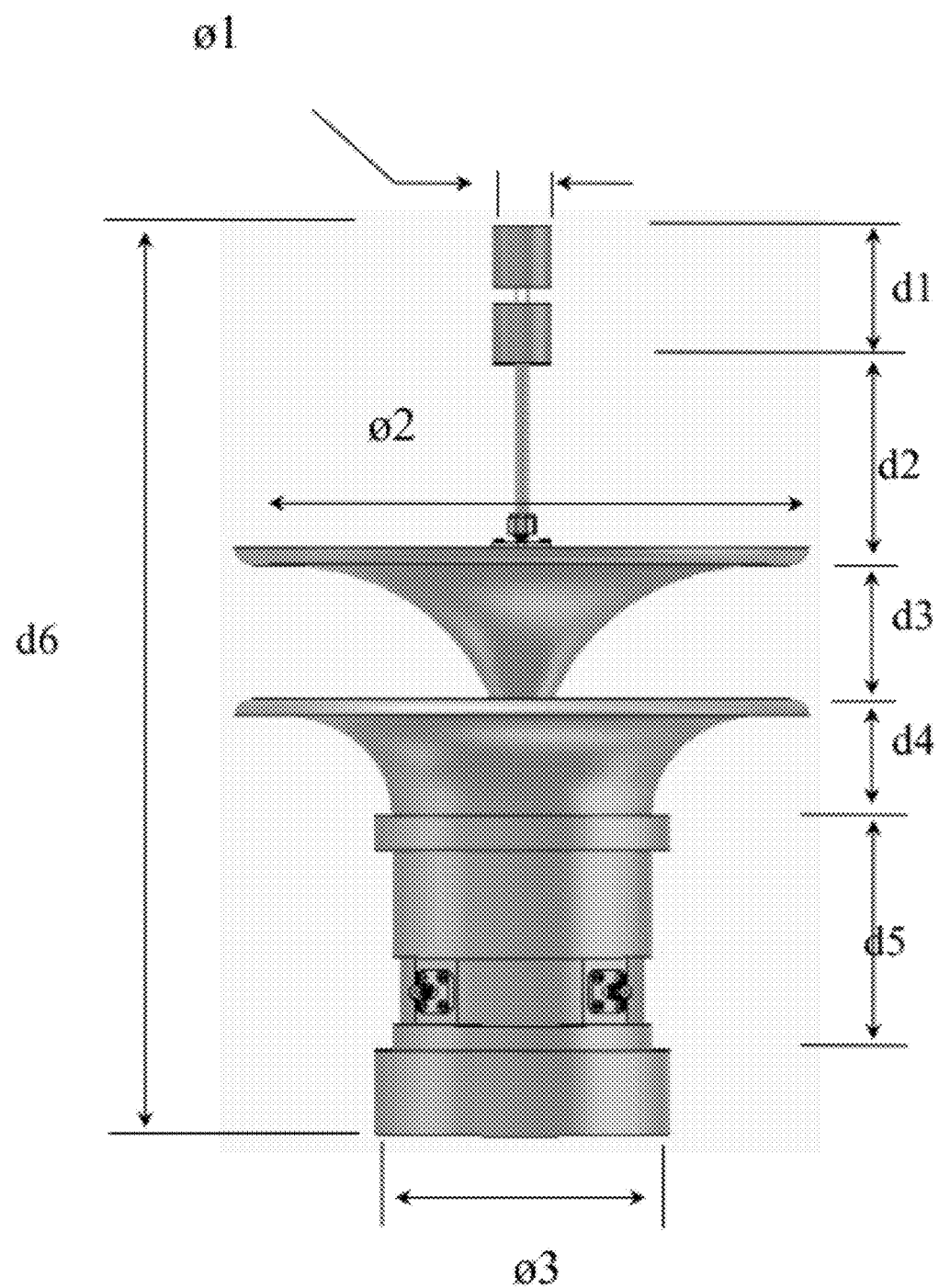
FIG. 7 shows optional dimensions of first and second omnidirectional antennas of the antenna system illustrated in FIG. 5.

Reference is now made to FIGS. 5-7, which schematically illustrate an antenna system 100' for finding the DOA of an arriving signal, according to other embodiments of the invention.

According to these embodiments, antenna system 100' may comprise: a first omnidirectional antenna 110'; a second omnidirectional antenna 120'; and a feed assembly 200'.

First omnidirectional antenna 110' may comprise:
a continuous multimodal omnidirectional antenna such as a biconical horn antenna 111', for example; and
a circular waveguide (CWG) 130'.

Second omnidirectional antenna 120' may comprise a dipole antenna 121' and a guiding member 122', which may include a coaxial cable or a balanced line.

CWG 130' may be a cylindrical waveguide, which may include a cylindrical hollowed shape creating a cavity therein, which may be filled with air. CWG 130' may further comprise four probes 135a', 135b', 135c' and 135d' protruding from the cylinder of CWG 130', wherein a part of guiding member 122' of second omnidirectional antenna 120' may be coaxially inserted through the upper waveguide funnel portion of first omnidirectional antenna 110' and through CWG 130'.

According to some embodiments, as illustrated in FIG. 5, feed assembly 200' may comprise a printed board comprising:

two printed combiners: a first combiner 250a' and a second combiner 250b', where first combiner 250a' includes two inputs: 251a' and 251b' and second combiner 250b' includes two inputs 251c' and 251d';

a printed quadrature hybrid coupler 270' having two output ports: a first output port 271a' and a second output port 271b'; and two printed 180° differential phase-shifters 260a' and 260b' (such as, for example, Schiffman printed phase-shifter).

According to some embodiments, each pair of adjacent inputs of each combiner 250a' and 250b' connect to a pair of opposite probes of CWG 130' (e.g. inputs 251a' and 251b' connect to probes 135d' and 135b' respectively and inputs 251c' and 251d' connect to probes 135c' and 135a' respectively, as illustrated in FIG. 5) via one of said 180° differential phase shifters (260a' and 260b' respectively), and the two outputs of combiners 250a' and 250b' are configured to operatively connect to the two inputs of printed hybrid coupler 270' via a second set of two equal length printed transmission lines.

Probes 135a', 135b', 135c' and 135d' may connect to inputs 251d', 251b', 251c' and 251a' respectively via any connecting means known in the art such as, for example, via coaxial transmission lines enabling to guide the signals outputted from CWG 130' at a predefined frequency range corresponding to antenna system 100' frequency range definitions.

According to some embodiments, first output port 271a' provides a first output signal of a first phase that includes two phase components: a first phase component that is positively proportional to the azimuth angle of the arriving signal and is referred to as "+1" and a second phase component that corresponds to the elevation of the arriving signal, which corresponds to the distance "D" between antennas 110' and 120'. The phase of the first output signal is used to extract the first phase difference $\Delta_1$. Second output port 271b' provides a second output signal of a second phase that includes two phase components: a first phase component that is negatively proportional to the azimuth angle of the arriving signal referred to as "−1" and a second phase component that corresponds to the elevation of the arriving signal and also corresponds to the distance "D", wherein the phase of the second output signal is used to extract the second phase difference $\Delta_2$. In this case the diameter of CWG 130' allows only $TE_{11}$ circular waveguide mode to propagate from the biconical horn 110' or 111' to the four probes 135a', 135b', 135c' and 135d' and the $TE_{11}$ mode corresponds to the two (+1) and (−1) phase modes outputted at the hybrid outputs 271a' and 271b' respectively. In this specific case the diameter of the CWG is configured to filter higher circular waveguide modes such as $TE_{21}$ that corresponds to the (+2) and (−2) phase modes as explained farther below.

Ports 271a' and 271b' and the output port of guiding member 122' may be used for extracting the "+1" "−1" and "0" signals (or phase-modes) to allow extracting the phase differences $\Delta_1$ and $\Delta_2$ therefrom, and be used in the following calculation:

The first phase difference $\Delta_1$ may be proportional to: $(\phi+\beta)$ wherein $\phi$ is proportional to the azimuth angle of the arriving signal and $\beta$ corresponds to the elevation contribution of the arriving signal, and to the distance "D" between first omnidirectional antenna 110' and second omnidirectional antenna 120'. The second phase difference $\Delta_2$ is proportional to $(-\phi+\beta)$, where the elevation contribution $\beta_{DOA}$ is extracted by the calculation of:

$$\beta_{DOA}=\tfrac{1}{2}\times(\Delta_1+\Delta_2)$$

and once the elevation contribution $\beta_{DOA}$ is extracted, the azimuth angle $\phi_{DOA}$ is extracted by one of the calculations of:

$$\phi_{DOA}=(\Delta_1-\beta_{DOA});$$

$$\phi_{DOA}=-(\Delta_2-\beta_{DOA}).$$

The reference phase (also referred to as zero phase) for extracting $\Delta_1$ and $\Delta_2$ is taken from second omnidirectional antenna 120' (the output port of guiding member 122') and it corresponds only to the elevation due to the distance "D" between first omnidirectional antenna 110' and second omnidirectional antenna 120' and therefore allows each of $\Delta_1$ and $\Delta_2$ to correspond to both elevation and azimuth of the arriving signal.

CWG 130' may be of dimensions corresponding to the desired frequency range of the arriving signals desired to be received and analyzed. For a frequency range of wavelengths range: $\lambda_{fmax}<\lambda<\lambda_{fmin}$, the diameter of the outer circumference of CWG 130' may be of the dimensions of $r_1=2\lambda_{fmin}/\pi$, wherein $\pi_{fmin}$ is the wavelength of lowest frequency in the range; and the outer diameter of the coaxial metal column of CWG 130', wherein guiding member 122' passes through, may be of the dimensions of $r_2=r_1/15$.

Printed board feed assembly 200' may be based upon at least one of: printed microstrip technology, printed stripline technology, printed coplanar waveguide technology, printed slot-line waveguide technology, or any other technology known in the art.

FIG. 7 schematically illustrates first and second omnidirectional antennas 110' and 120' dimensions, according to one embodiment of the invention. For frequency range of 3.5-4.5 GHZ the dimensions may be as follows:

(1) the diameter "φ1" of dipole antenna 121' is approximately 1.6 cm;
(2) the diameter "φ2" of biconical horn antenna 111' is approximately 15 cm;
(3) the outer diameter "φ3" of CWG 130' base is approximately 8 cm and the inner diameter of CWG 130' is 6 cm (empty circular cavity created inside CWG 130');
(4) the length "d1" of dipole antenna 121' is approximately 4.1 cm;
(5) the distance "d2" between the lower end of dipole antenna 121' and upper end of biconical horn antenna 111' is approximately 13 cm;
(6) the distance "d3" between the two plates of biconical horn antenna 111' is approximately 4 cm;
(7) the distance "d4" between the lower end of biconical horn antenna and the upper end of CWG 130' is approximately 3 cm;
(8) the distance "d5" is the length of the cavity created inside CWG 130' and is approximately 7 cm; and
(9) the distance "d6" between the upper end of second omnidirectional antenna 120' and the lower end of CWG 130' is approximately 34.6 cm.

Antenna system 100' may be configured to find DOA of wireless arriving signals of various types such as: microwave wireless signals, RF (radio frequency) wireless signals, or acoustic signals of one or more frequency ranges.

The first omnidirectional antenna may comprise a continuous multimodal and omnidirectional antenna or a discrete multimodal and omnidirectional antenna, where in embodiments where the first omnidirectional antenna comprises a discrete multimodal antenna the discrete multimodal antenna may comprise a circular antenna array, wherein the circular antenna array comprises one of: a plurality of dipole antennas; a plurality of monopole antennas; a plurality of patch antennas; a plurality of tapered slot-line antennas; or a plurality of horn antennas.

According to some embodiments, the circular antenna array may feed a discrete feed assembly with two output ports corresponding to the "+1" and "−1" circular-array phase-modes, or a Butler matrix with only +1 and −1 mode ports.

The second omnidirectional antenna may be one of: a dipole antenna, a biconical dipole antenna or a radial parallel-plate antenna wherein the plates may flare apart at some distance as in a biconical horn antenna. In the case where the second omnidirectional antenna comprises a dipole antenna or a biconical dipole antenna it may feed a coaxial transmission line or a balanced transmission line.

The guiding member fed by the second omnidirectional antenna may be one of: a coaxial transmission line or a balanced transmission line, where in the case where the guiding member is a balanced transmission line, the balanced transmission line may feed a balanced-to-unbalanced transition device.

The cases described above describe continuous second omnidirectional antennas, wherein second omnidirectional antenna may be a discrete antenna comprising a circular-antenna-array as described in the following paragraph.

The second omnidirectional antenna may be a circular-antenna-array feeding an equal power combiner wherein the equal power combiner feeds the guiding member, where the circular antenna array may comprise one of: a plurality of dipole antennas, a plurality of monopole antennas, a plurality of patch antennas, a plurality of tapered slot-line antennas or a plurality of horn antennas.

The equal power divider may be one of: a radial power combiner that feeds a coaxial transmission line; or an N-way Wilkinson power combiner. The N-way Wilkinson power combiner may be implemented in a printed board for low cost, or by any technique known in the art.

The novel DOA method described herein may allow a DOA antenna that uses very simple hardware, in some embodiments thereof. The hardware reduction is achieved by replacing one of the two multimodal antennas, required in usual DOA methods, by a simple omnidirectional antenna. A possible embodiment wherein the second omnidirectional antenna comprises a wrap-around strip element fed at eight points by a printed eight-way power combiner and the first omnidirectional antenna comprises a circular array of eight dipoles feeding a printed 8×8 Butler matrix with eight inputs and only +1 and −1 mode ports is a very light-weight and low-cost DOA antenna suitable for mass production. In a possible embodiment the configuration may include a polarizer for receiving slant, circular or any desired polarized signals. When the first and second omnidirectional antennas are of the same diameter and coaxially located about an axis they do not block each other's view and when they are separated by a distance of ½λ the antenna system may find the DOA of signals arriving from 360° in azimuth and up to about ±30° in elevation below and above the horizon.

In another possible embodiment the 8×8 Butler matrix may be a single layer wrap-around printed circuit, printed together with the radiating elements of the first omnidirectional antenna on a common flexible substrate. In this specific embodiment, the use of a first omnidirectional multimodal antenna together with a second simple omnidirectional antenna, reduces the overall axial-size of the DOA antenna compared with the use of two multimodal omnidirectional antennas in the prior art, as the printed Butler matrix is much larger along the axial dimension than the printed corporate feed of the second simple omnidirectional antenna, due to the large number of components required to implement the printed single-layer Butler matrix.

In another possible embodiment the first and second omnidirectional antennas may consist of circular arrays of a plurality of discrete dual-polarized antenna elements, wherein each antenna element has two ports, wherein two equal N-way power combiners feed the dual-polarized circular-array of the second omnidirectional antenna, and two circular-phase-modes feeding-networks feed the circular-array of the first omnidirectional antenna.

According to some embodiments, the first omnidirectional antenna may be a multimodal omnidirectional antenna configured to transform the arriving signal into at least three output signals wherein the output signals are of the following four signals: a first output signal provided at port +1 corresponding to the first-order positive-slope circular-phase-mode, a second output signal provided at port −1 corresponding to the first-order negative-slope circular-phase-mode, a third output signal provided at port +2 corresponding to the second-order positive-slope circular-phase-mode and a fourth output signal that is provided at port −2 corresponding to the second-order negative-slope circular-phase-mode.

The phase of the first output signal is proportional to the azimuth angle $\phi$ of the arriving signal and is of slope "+1" and the phase of the second output signal is proportional to the azimuth angle $\phi$ of the arriving signal and is of slope "−1" and the phase of the third output signal is proportional to the azimuth angle $\phi$ of the arriving signal and is of slope "+2" and the phase of the fourth output signal is proportional to the azimuth angle $\phi$ of the arriving signal and is of slope "−2", wherein at least two of the output signals are of the same order and at least one output signal corresponds to a first-order circular-phase-mode. In any case two of the at least three output signals that are from the mentioned four signals are of the same order and at least one of them is of the first-order. This condition allows resolving the three unknowns: $\phi$, $\beta_1$ and $\beta_2$ wherein $\phi$ is proportional to the azimuth angle and $\beta_1$ corresponds to the elevation contribution of a first-order mode, and $\beta_2$ corresponds to the elevation contribution of a second-order mode, wherein the first-order mode is required to prevent ambiguity in the decided azimuth angle.

This may allow configurations of the antenna system that enable outputting any of the following combinations:
1) (+1) and (−1); this option is similar to the previous configuration with only two output signals outputted by the first omnidirectional antenna, and is counted if we say that the first omnidirectional antenna outputs at least two output signals wherein at least two are of the same order and at least one is of a first-order.
2) (+1), (−1) and (+2);
3) (+1), (−1) and (−2);
4) (+1), (+2) and (−2);
5) (−1), (+2) and (−2); and/or
6) (+1), (−1), (+2) and (−2). This configuration is the only one with four output signals outputted by the first omnidirectional antenna.

For example, to allow outputting at least three signals in which at least one is a signal of a first-order and at least two of the signals are of the same order, the antenna system is of a CWG with eight output ports (such as coaxial output ports) and the CWG is of a larger diameter enabling guiding the $TE_{11}$ and $TE_{21}$ modes and the feed assembly may include a printed board configured to receive eight input signals from the eight output ports of the CWG, where the feed assembly may comprise at least three output ports for outputting the at least three signals including the at least two signals of similar order and the at least one signal of a first-order. To allow guiding circular waveguide modes that are higher than the first mode the diameter of the CWG may be slightly larger than the diameter of a CWG for outputting only first-order modes. The feed assembly that connect to the 8 output ports of the CWG may be a Butler matrix with 8 input ports and at least three output modes, for example: (+1), (−2) and (+2); (−1), (−2) and (+2); (+1), (−1) and (+2); (+1), (−1) and (−2); (+1), (−1), (−2) and (+2).

Some embodiments of the invention are further detailed at: Remez, J.; Ben-Ari, E., "Low-Loss Wideband Multimodal Interferometric Antenna for DOA in Azimuth and Elevation," *Antennas and Wireless Propagation Letters,* IEEE, vol. 8, pp. 898-902, 2009, which is incorporated by reference herein in its entirety.

Figure 8:
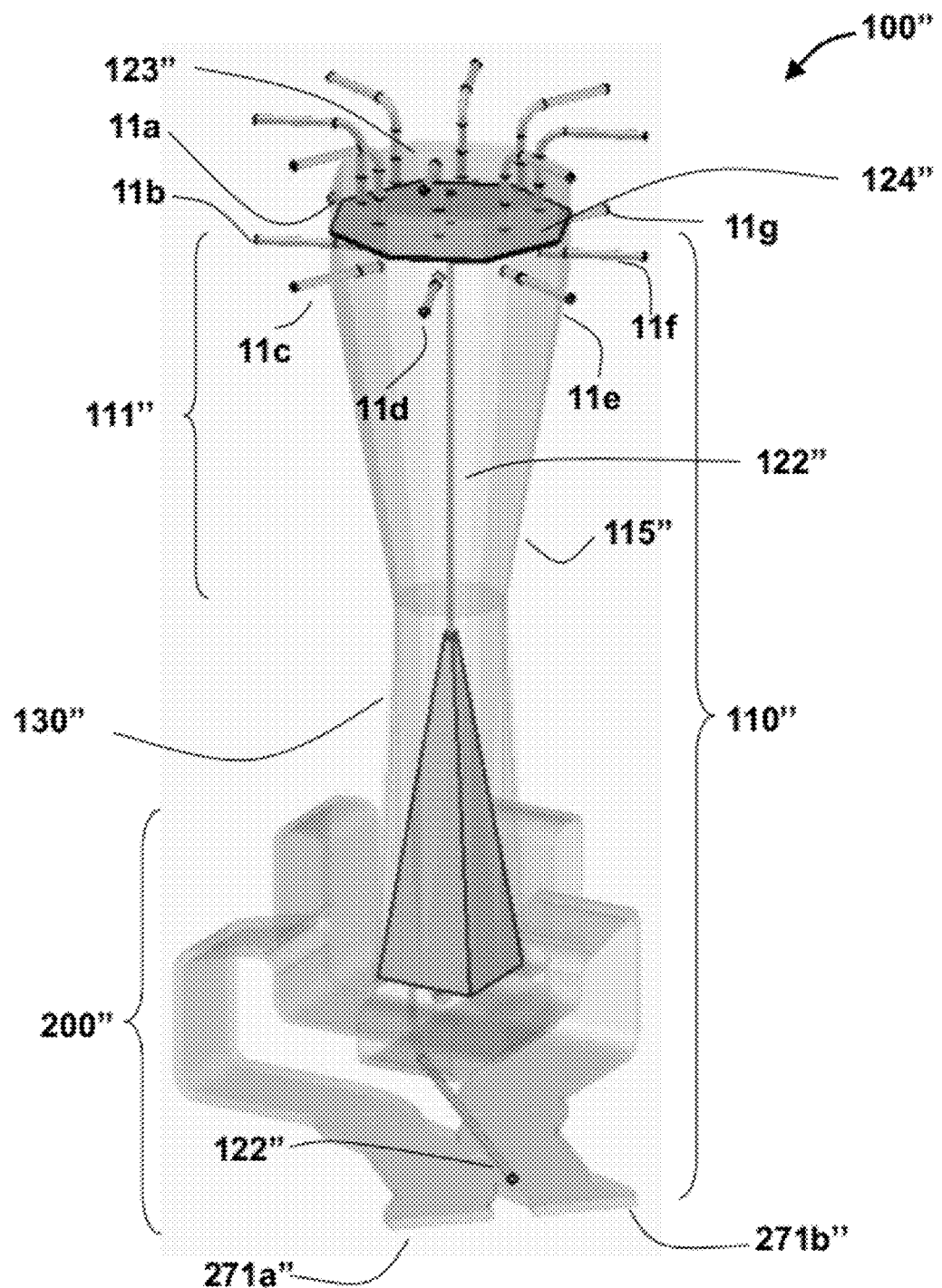
FIG. 8 shows a feeding assembly of an antenna system for finding direction-of-arrival of arriving signals, feeding a discrete antenna array, according to other embodiments of the invention.

Reference is now made to FIG. 8, which schematically illustrates an antenna feed 100", which feeds a discrete antenna for finding DOA of an arriving signal, according to some embodiments of the invention.

Antenna feed 100" may comprise:

a first omnidirectional discrete antenna feed assembly 110" including a discrete multimodal combiner 111" comprising a horn shaped portion 115" and a plurality of probes feeding a plurality of waveguides 11a, 11b, 11c, 11d, 11e, 11f, 11g and 11h and discrete antenna feed assembly 110" further comprising a rectangular to circular waveguide transition CWG 130" similar to CWG 130 and a feed assembly 200" which may be similar to feed assembly 200;

a radial combiner feed 123", comprising a plurality of probes, fed by a discrete second omnidirectional antenna, wherein combiner 123" also comprises a central probe connected to guiding member 122", which may include a coaxial transmission line.

According to this embodiment, discrete multimodal antenna may include an antenna array including a plurality of antenna elements feeding waveguides such as waveguides 11a, 11b, 11c, 11d, 11e, 11f, 11g and 11h, wherein the waveguides are any connection means known in the art such as coaxial transmission lines enabling to receive the arriving signal and transform the signal into at least two output signals such as a first-order output signal of a positive phase slope (+1) and first-order output signal of a negative phase slope (−1) outputted at ports 271a" and 271b".

Each waveguide out of: 11a, 11b, 11c, 11d, 11e, 11f, 11g and 11h may be operatively connected to the multimodal combiner 111" comprising a horn shaped portion 115" and a plurality of probes wherein each waveguide connects to one probe, and wherein horn shaped portion 115" may connect to CWG 130".

A conductive plate 124" is configured to cover horn shaped portion 115" and serves as the back reflective plane of the probes of the multimodal combiner 111" and separates between multimodal combiner 111" and radial combiner 123". A conductive plate 124" serves as the bottom plane of the monopole probes in radial combiner 123".

In another embodiment if the multimodal combiner and the radial combiner are of wideband design, the configuration yields a wideband and lossless feed assembly that feeds a discrete antenna for finding DOA of an arriving signal.

According to some embodiments, the circular antenna array of antenna system may feed a discrete feed assembly with at least three output ports wherein the output ports may be of the four ports corresponding to the two first-order circular-phase-modes and the two second-order circular-phase-modes, wherein at least two of the output ports correspond to circular-phase-modes of the same order and at least one of the outputs corresponds to a first-order mode.

The circular antenna array may alternatively feed a Butler matrix with at least three output ports wherein the output ports are of the four ports corresponding to the two first-order circular-phase-modes and the two second-order circular-phase-modes, wherein at least two of the output ports correspond to circular-phase-modes of the same order and at least one of the outputs corresponds to a first-order mode.

Figure 9:
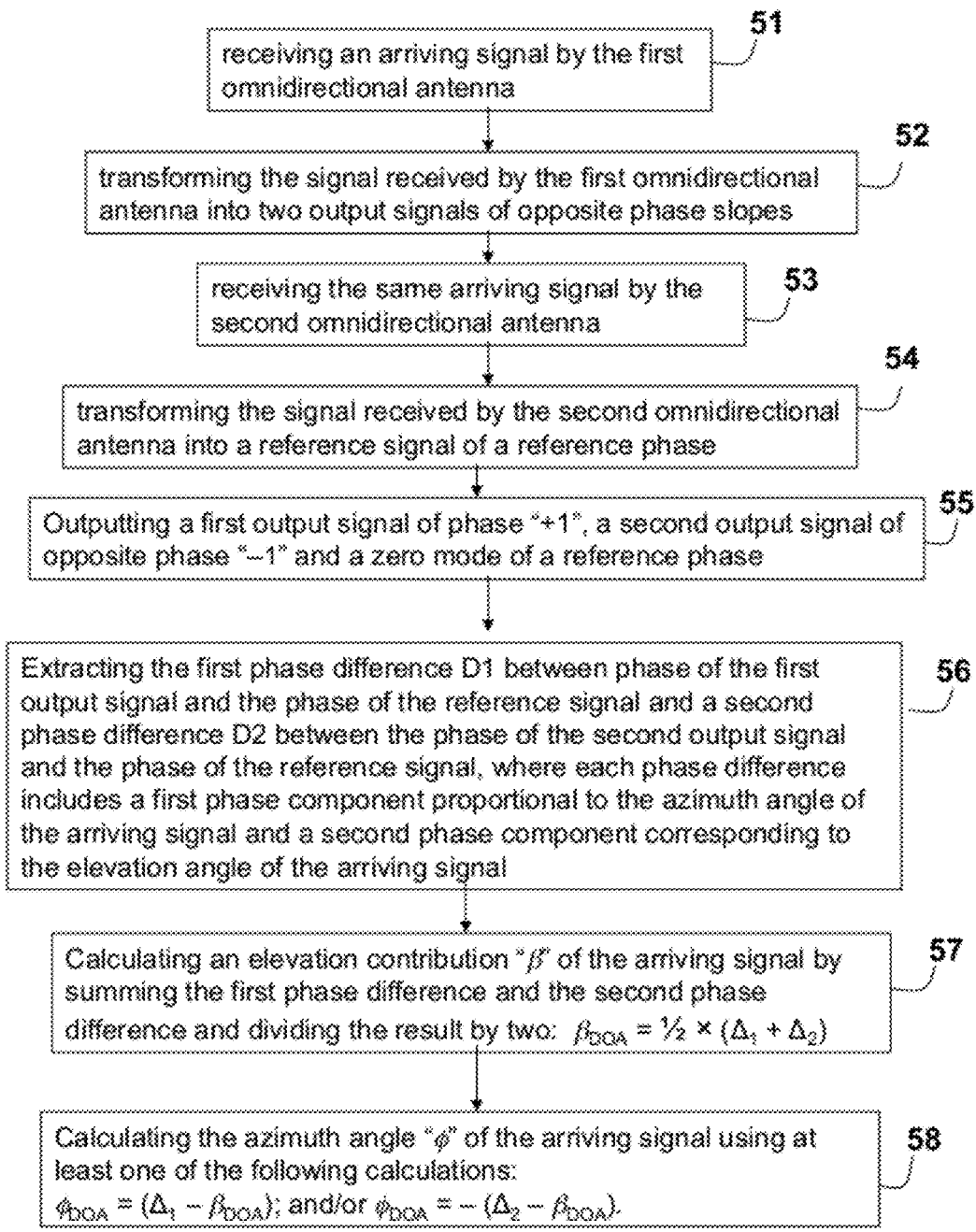
FIG. 9 shows a method for finding direction of arrival of arriving signals, according to some embodiments of the invention.

Reference is now made to FIG. 9, which schematically illustrates a method for finding DOA of arriving signals, according to some embodiments of the invention. The method may be fitted for an antenna system comprising a first omnidirectional antenna and a second omnidirectional antenna, where the first omnidirectional antenna is configured to output first-order output signals of opposite phase slopes (+1) and (−1). The method may comprise:

receiving an arriving signal 51, wherein the first omnidirectional antenna receives an arriving signal;

transforming the received signal into two output signals 52: a first output signal and a second output signal, wherein the phases of the two output signals proportional to the azimuth angle of the arriving signal with opposite phase-slopes and correspond to the elevation angle of the arriving signal, and wherein the transformation is carried out by the first omnidirectional antenna, which is located coaxially about a vertical axis in relation to the second omnidirectional antenna, and separated therefrom at a predefined vertical distance D;

receiving the same arriving signal 53, by the second omnidirectional antenna;

transforming the signal received by the second omnidirectional antenna into a reference signal of a reference (0) phase 54;

outputting a first first-order output signal of a positive phase-slope (+1) and a second first-order output signal of a negative phase-slope (−1) and reference signal of reference phase (0) 55;

extracting a first phase difference $\Delta_1$ between the phase of the first output signal and the phase of the reference signal and a second phase difference $\Delta_2$ between the phase of the second output signal and the phase of the reference signal 56, wherein each phase difference includes a first phase component proportional to the azimuth angle of the arriving signal and a second phase component corresponding to the elevation of the arriving signal;

calculating an elevation contribution "β" of the arriving signal by summing up the first phase difference and the second phase difference and dividing the result by two: $\beta_{DOA}=\frac{1}{2}\times(\Delta_1+\Delta_2)$ 57, where $\beta_{DOA}$ corresponds to the elevation "α" according to: $(2\pi D/\lambda)\times\sin(\alpha)$, where λ is the wavelength of the arriving signal; and calculating the azimuth angle "φ" of the arriving signal 58, according to at least one of: $\phi_{DOA}=(\Delta_1-\beta_{DOA})$; and/or $\phi_{DOA}=-(\Delta_2-\beta_{DOA})$.

Figure 10:
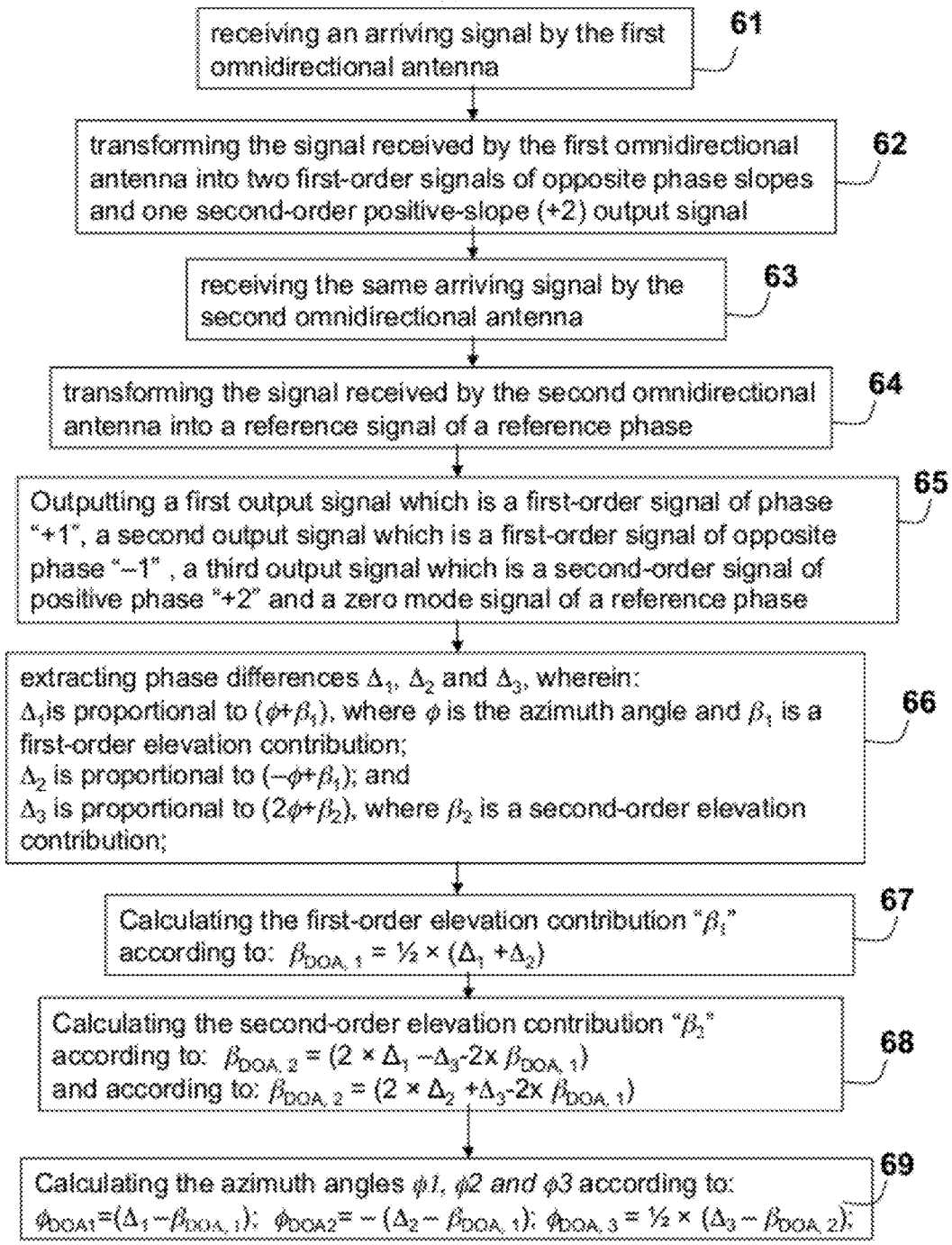
FIG. 10 shows a method for finding direction of arrival of arriving signals, according to other embodiments of the invention.

Reference is now made to FIG. 10, which schematically illustrates a method for finding DOA of arriving signals, according to some embodiments of the invention. The method may be fitted for an antenna system comprising a first omnidirectional antenna and a second omnidirectional antenna, where the first omnidirectional antenna is configured to output first-order output signals of opposite phase slopes (+1) and (−1) and a second-order output signal of a positive phase slope of: (+2). The method may comprise:

receiving an arriving signal 61, wherein the first omnidirectional antenna receives an arriving signal;

transforming the received signal into three output signals: (+1), (−1) and (+2) 62, wherein the phases of the output signals are proportional to the azimuth angle and correspond to the elevation angle of the arriving signal, and wherein the transformation is carried out by the first omnidirectional antenna, which is located coaxially below or above the second omnidirectional antenna and separated therefrom at a predefined distance D;

receiving the same arriving signal 63, by the second omnidirectional antenna;

transforming the signal received by the second omnidirectional antenna into a reference signal of a reference (0) phase 64;

outputting a first first-order output signal of a positive phase slope (+1), a second first-order output signal of a negative phase slope (−1), and a third second-order output signal of positive phase slope (+2) and outputting the reference signal of zero phase slope (0) 65;

extracting phase differences $\Delta_1$, $\Delta_2$ and $\Delta_3$ 66, wherein: 4$_1$ is proportional to $(\phi+\beta_1)$, where $\phi$ is proportional to the azimuth angle and $\beta_1$ is a first-order elevation contribution; $\Delta_2$ is proportional to $(-\phi+\beta_1)$; and $\Delta_3$ is proportional to $(2\phi+\beta_2)$, where $\beta_2$ is a second-order elevation contribution;

calculating the first-order elevation contribution "$\beta_1$" according to:

$\beta_{DOA,1} = \frac{1}{2} \times (\Delta_1 + \Delta_2)$ 67;

calculating the second-order elevation contribution 68 "$\beta_2$" according to:

$\beta_{DOA,2} = -(2 \times \Delta_1 - \Delta_3 - 2 \times \beta_{DOA,1})$ or according to:

$\beta_{DOA,2} = -(2 \times \Delta_2 + \Delta_3 - 2 \times \beta_{DOA,1})$; and calculating the azimuth angles $\phi_1$, $\phi_2$ and $\phi_3$ according to:

$\phi_{DOA,1} = (\Delta_1 - \beta_{DOA,1})$; $\phi_{DOA,2} = -(\Delta_2 - \beta_{DOA,1})$; and $\phi_{DOA,3} = \frac{1}{2} \times (\Delta_3 - \beta_{DOA,2})$ 69.

In another embodiment, where the antenna system is configured to output three signals wherein the first output signal is a signal of a first-order having a negative phase-slope (−1), the second output signal is a signal of a second-order having a positive phase-slope (+2) and the third output signal is a signal of second-order having a negative phase-slope (−2). In this case: the first phase difference $\Delta_1$ is proportional to: $(-\phi+\beta_1)$ wherein $\phi$ is proportional to the azimuth of the arriving signal and $\beta_1$ is the first-order elevation contribution of the arriving signal, and the second phase difference $\Delta_2$ is proportional to $(2\phi+\beta_2)$, wherein $\beta_2$ is the second-order elevation contribution of the arriving signal and the third phase difference $\Delta_3$ is proportional to $(-2\phi+\beta_2)$.

In this case, the second elevation contribution $\beta_{DOA,2}$ is extracted by the calculation of:

$\beta_{DOA,2} = \frac{1}{2} \times (\Delta_2 + \Delta_3)$ and the first elevation contribution $\beta_{DOA,1}$ is extracted by one of the calculations of:

$\beta_{DOA,1} = \frac{1}{2} \times (2 \times \Delta_1 + \Delta_2 - \beta_{DOA,2})$ or $\beta_{DOA,1} = \frac{1}{2} \times (2 \times \Delta_1 - \Delta_3 + \beta_{DOA,2})$, wherein the elevation result $\beta_{DOA}$ is extracted from the $\beta_{DOA,1}$ and $\beta_{DOA,2}$ results, wherein the first azimuth result $\phi_{DOA,1}$ is extracted by the calculation of:

$\phi_{DOA,1} = -(\Delta_1 - \beta_{DOA,1})$;

and the second azimuth result $\phi_{DOA,2}$ is extracted by one of the calculations of:

$\phi_{DOA,2} = \frac{1}{2} \times (\Delta_2 - \beta_{DOA,2})$ $\phi_{DOA,2} = -\frac{1}{2} \times (\Delta_3 - \beta_{DOA,2})$, wherein the azimuth result $\phi_{DOA}$ is extracted from the $\phi_{DOA,1}$ and $\phi_{DOA,2}$ results.

In another embodiment, where the antenna system is configured to output three signals wherein the first output signal is a signal of a first-order having a positive phase-slope (+1), the second output signal is a signal of a first-order having a negative phase-slope (−1) and the third output signal is a signal of second-order having a negative phase-slope (−2). In this case: the first phase difference $\Delta_1$ is proportional to: $(\phi+\beta_1)$ wherein $\phi$ is proportional to the azimuth angle of the arriving signal and $\beta_1$ is the first-order elevation contribution of the arriving signal, and the second phase difference $\Delta_2$ is proportional to $(-\phi+\beta_1)$, and the third phase difference $\Delta_3$ is proportional to $(-2\phi+\beta_2)$ wherein $\beta_2$ is the second-order elevation contribution of the arriving signal, wherein the first elevation contribution $\beta_{DOA,1}$ is extracted by the calculation of:

$\beta_{DOA,1} = \frac{1}{2} \times (\Delta_1 + \Delta_2)$ and the second elevation contribution $\beta_{DOA,2}$ is extracted by one of the calculations of:

$\beta_{DOA,2} = (2 \times \Delta_1 + \Delta_3 - 2 \times \beta_{DOA,1})$ $\beta_{DOA,2} = -(2 \times \Delta_2 - \Delta_3 - 2 \times \beta_{DOA,1})$, wherein the elevation result $\beta_{DOA}$ is extracted from the $\beta_{DOA,1}$ and $\beta_{DOA,2}$ results, wherein the first azimuth result $\phi_{DOA,1}$ is extracted by the calculation of:

$\phi_{DOA,1} = (\Delta_1 - \beta_{DOA,1})$;

and the second azimuth result $\phi_{DOA,2}$ is extracted by the calculation of:

$\phi_{DOA,2} = -(\Delta_2 - \beta_{DOA,1})$;

and the third azimuth result $\phi_{DOA,3}$ is extracted by the calculation of:

$\phi_{DOA,3} = -\frac{1}{2} \times (\Delta_3 - \beta_{DOA,2})$, wherein the azimuth result $\phi_{DOA}$ is extracted from the $\phi_{DOA,1}$, $\phi_{DOA,2}$ and results.

In another embodiment, where the antenna system is configured to output three signals wherein the first output signal is a signal of a first-order having a positive phase-slope (+1), the second output signal is a signal of a first-order having a negative phase-slope (−1), the third output signal is a signal of second-order having a positive phase-slope (+2) and the fourth output signal is a signal of second-order having a negative phase-slope (−2): In this case: the first phase difference $\Delta_1$ is proportional to: $(\phi+\beta_1)$ wherein $\phi$ is proportional to the azimuth angle of the arriving signal and $\beta_1$ is the first-order elevation contribution of the arriving signal, and the second phase difference $\Delta_2$ is proportional to $(-\phi+\beta_1)$, and the third phase difference $\Delta_3$ is proportional to $(2\phi+\beta_2)$ wherein $\beta_2$ is the second-order elevation contribution of the arriving signal, and the fourth phase difference $\Delta_4$ is proportional to $(-2\phi+\beta_2)$, wherein the first elevation contribution $\beta_{DOA,1}$ is extracted by the calculation of:

$\beta_{DOA,1} = \frac{1}{2} \times (\Delta_1 + \Delta_2)$ and the second elevation contribution $\beta_{DOA,2}$ is extracted by the calculation of:

$\beta_{DOA,2} = \frac{1}{2} \times (\Delta_3 + \Delta_4)$, wherein the elevation result $\beta_{DOA}$ is extracted from the $\beta_{DOA,1}$ and $\beta_{DOA,2}$ results, wherein the first azimuth result $\phi_{DOA,1}$ is extracted by the calculation of:

$\phi_{DOA,1} = (\Delta_1 - \beta_{DOA,1})$;

and the second azimuth result $\phi_{DOA,2}$ is extracted by the calculation of:

$$\phi_{DOA,2} = -\tfrac{1}{2} \times (\Delta_2 - \beta_{DOA,1});$$

and the third azimuth result $\phi_{DOA,3}$ is extracted by the calculation of:

$$\phi_{DOA,3} = \tfrac{1}{2} \times (\Delta_3 - \beta_{DOA,2}),$$

and the fourth azimuth result $\phi_{DOA,4}$ is extracted by the calculation of:

$$\phi_{DOA,4} = -\tfrac{1}{2} \times (\Delta_4 - \beta_{DOA,2}),$$

wherein the azimuth result $\phi_{DOA}$ is extracted from the $\phi_{DOA,1}$, $\phi_{DOA,2}$, $\phi_{DOA,3}$ and $\phi_{DOA,4}$ results.

According to other embodiments of the invention, the antenna system may be configured to find the DOA of an acoustic signal, wherein the first omnidirectional antenna comprises an omnidirectional acoustic sensor, such as a microphone, configured to receive acoustic signals and the second omnidirectional antenna comprises an omnidirectional acoustic sensor configured to receive acoustic signals.

Figure 11:
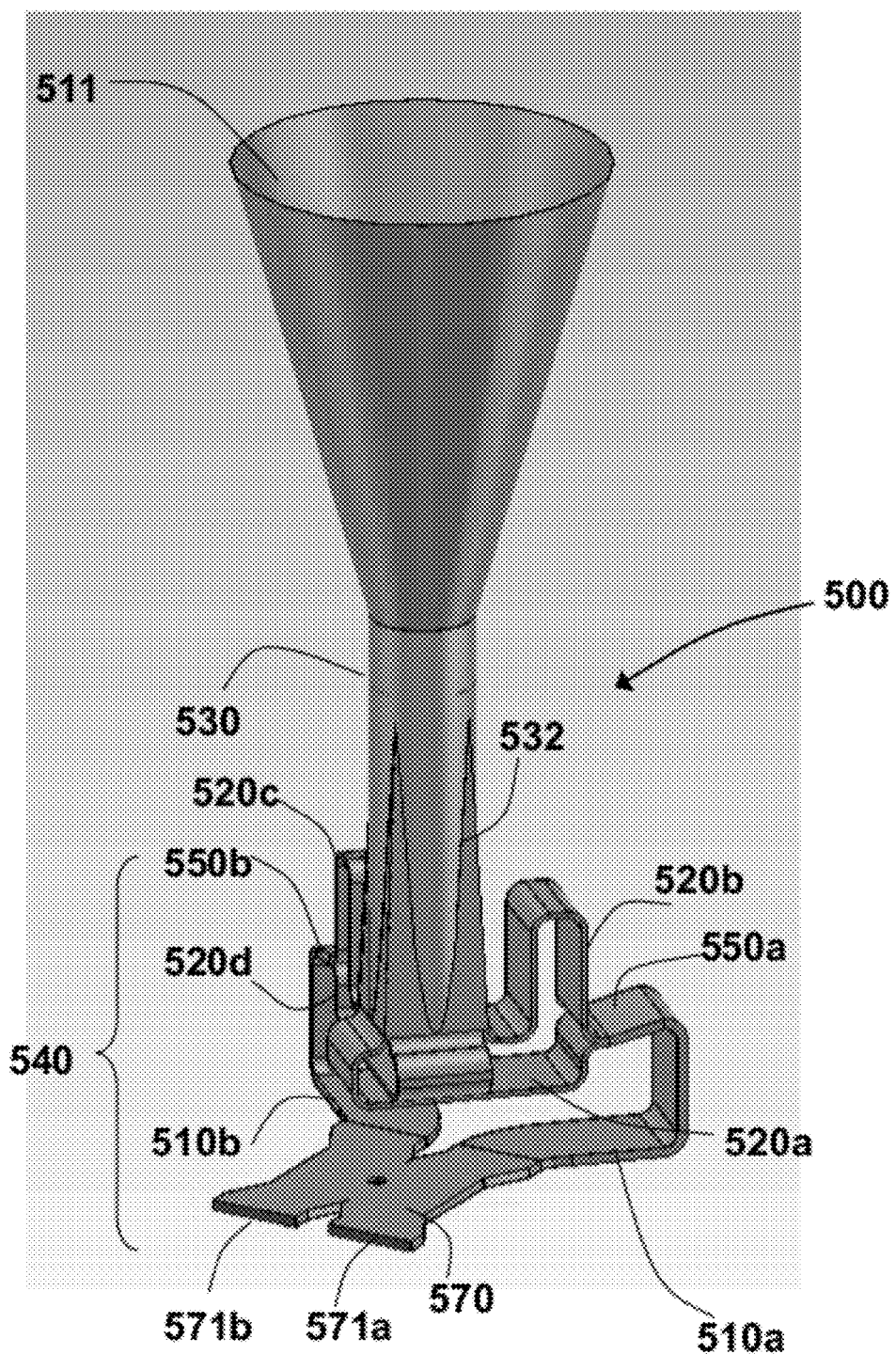
FIG. 11 shows a circular horn antenna feed enabling to transmit or receive wideband left-hand and right-hand circularly polarized signals via a circular horn antenna, according to other embodiments of the invention.

Reference is now made to FIG. 11, which schematically illustrates a circular horn antenna feed 500 for signals transmission, according to other embodiments of the invention. Antenna feed 500 that feeds a circular horn antenna 511 may comprise: a circular waveguide (CWG) 530 of a diameter configured to guide only the $TE_{11}$ circular waveguide mode, wherein CWG 530 transforms into a housing 532 enveloping a rectangular pyramid similar to pyramid 131, wherein the space created between housing 532 and the pyramid therein creates four separated rectangular inputs.

According to some embodiments, circular horn antenna feed 500 may further comprise:

a feed assembly 540 with two input ports: a first input port 571a and a second input port 571b, wherein in transmit mode the first input port generates a right-hand circularly polarized (CP) field, and the second input port generates a left-hand CP field;

a quadrature hybrid coupler 570, which may be, for example, a side-wall or a top-wall hybrid coupler;

a first set of two rectangular waveguides 510a and 510b of equal length;

a second set of four rectangular waveguides 520a, 520b, 520c and 520d of equal length;

two 2-way power dividers 550a and 550b, which may be, for example E-plane power dividers, wherein the two outputs of hybrid coupler 570 are operatively connected via the waveguides 510a and 510b to the inputs of power dividers 550a and 550b respectively.

Two of the second set waveguides 520a and 520b operatively connect the two outputs of first power divider 550a to a pair of opposing rectangular inputs in CWG 530, and the other two waveguides 520c and 520d of the second set operatively connect the two outputs of the second power divider 550b to the second pair of opposing rectangular inputs in CWG 530.

Each pair of opposing inputs in CWG 530 create a linear $TE_{11}$ field, wherein the two fields are orthogonal and in quadrature. The two fields create a left-hand or right-hand CP-field, wherein CWG 530 is configured to guide the CP-field towards the input port of circular horn antenna 511.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. An antenna system for estimating the direction-of-arrival (DOA) of an arriving signal, wherein said arriving signal arrives substantially from the horizon within a predefined range of elevations below and above the horizon, said antenna system comprising:

a first omnidirectional antenna; and a second omnidirectional antenna, which is located coaxially about a predefined vertical axis in relation to said first omnidirectional antenna and separated therefrom at a predefined vertical distance D, wherein said first omnidirectional antenna is configured to receive said arriving signal and transform the received signal into at least two output signals: a first output signal and a second output signal, wherein the phases of said output signals are proportional to the azimuth angle of said arriving signal, wherein said second omnidirectional antenna is configured to receive said arriving signal and transform the received signal into a reference signal of a reference phase, said reference phase has a zero phase-slope and is independent of the azimuth angle of said arriving signal, wherein said phases of first and second output signals are shifted from the reference phase by a phase shift that depends upon the elevation direction of said arriving signal, corresponding to said distance D between said first and second omnidirectional antennas;

wherein said antenna system is configured to allow extracting at least two phase differences: a first phase difference $\Delta_1$ between the phase of the first output signal and the reference phase and a second phase difference $\Delta_2$ between the phase of the second output signal and the reference phase, wherein each said phase difference includes a first phase component proportional to the azimuth angle of said arriving signal and a second phase component corresponding to the elevation angle of said arriving signal; and wherein said antenna system is further configured to enable extracting the azimuth and the elevation angles of said arriving signal from said phase differences.

2. The antenna system of claim 1, wherein said at least two output signals are of the following four signals: a signal of a first-order having a positive phase-slope; a signal of a first-order having a negative phase-slope; a signal of a second-order having a positive phase-slope; a signal of a second-order having a negative phase-slope wherein at least two of said output signals are of the same order and at least one of said output signals is of a first-order.

3. The antenna system of claim 1, wherein said first omnidirectional antenna comprises a biconical horn antenna including two radial plates, an upper plate and a lower plate, wherein said upper plate is coaxially located above said lower plate, about said vertical axis, and wherein said upper plate comprises an upper waveguide funnel portion and said lower plate comprises a lower waveguide funnel portion, and wherein said lower waveguide funnel portion integrally connects to a circular waveguide (CWG) configured to guide a first-order circular waveguide mode ($TE_{11}$) received from said biconical-horn-antenna, wherein said CWG is of a diameter configured to filter out propagation of higher order circular-waveguide-modes.

4. The antenna system of claim 3, wherein said CWG further comprises a rectangular pyramid and a housing enveloping said rectangular pyramid, wherein said rectangular pyramid and housing create four separated rectangular outputs.

5. The antenna system of claim 4, wherein said second omnidirectional antenna further comprises a guiding member configured to guide said reference signal received from said second omnidirectional antenna, wherein a part of said guiding member is inserted through said upper waveguide funnel portion and through said rectangular pyramid of said CWG.

6. The antenna system of claim 5 further comprising a feed assembly operatively connected to the four rectangular outputs of said CWG, wherein said feed assembly is configured to enable extracting said phase differences $\Delta_1$ and $\Delta_2$, and wherein said feed assembly is based upon at least one of: rectangular waveguide technology, coaxial waveguide technology, stripline technology, microstrip technology, coplanar waveguide technology, or slotline technology.

7. The antenna system of claim 6, wherein said feed assembly comprises:
a first set of four rectangular waveguides of equal length;
a second set of two rectangular waveguides of equal length;
two E-plane power combiners, wherein each of said combiners has two inputs and one output port; and
a quadrature hybrid coupler wherein said hybrid coupler is one of: side-wall hybrid coupler; or top-wall hybrid coupler,
wherein two of said first set of rectangular waveguides operatively connect the first pair of opposing rectangular outputs of said CWG to the two inputs of the first E-plane combiner and the other two rectangular waveguides of said first set operatively connect the second pair of opposing rectangular outputs of said CWG to the two inputs of the second E-plane combiner, and wherein said second set of two rectangular waveguides operatively connect the two output ports of said E-Plane combiners to the two inputs of said hybrid coupler.

8. The antenna system of claim 7, wherein said hybrid coupler comprises two output ports: a first output port and a second output port, wherein said first output port provides a first output signal of a first phase, said phase includes two phase components: a first phase component proportional to the azimuth angle of said arriving signal wherein said first component is of a first-order and having a positive phase-slope and a second phase component corresponding to the elevation angle of the arriving signal, wherein said phase of said first output signal is used to extract said first phase difference $\Delta_1$, and said second output port of said hybrid coupler provides a second output signal of a second phase said phase includes two components: a first phase component proportional to the azimuth angle of the arriving signal wherein said first component is of a first order having a negative phase-slope and a second phase component corresponding to the elevation angle of the arriving signal, wherein said phase of said second output signal is used to extract said second phase difference $\Delta_2$.

9. The antenna system of claim 6, wherein said feed assembly further comprises two output ports: a first output port and a second output port, wherein said first output port provides a first output signal of a first phase said phase includes two phase components: a first phase component proportional to the azimuth angle of said arriving signal wherein said first component is of a first-order and having a positive phase-slope and a second phase component corresponding to the elevation angle of the arriving signal, wherein said phase of first output signal is used to extract said first phase difference $\Delta_1$, and said second output port provides a second output signal of a second phase said second phase includes two phase components: a first phase component proportional to the azimuth angle of the arriving signal wherein said first component is of a first-order and having a negative phase-slope and a second phase component corresponding to the elevation angle of said arriving signal, wherein said phase of second output signal is used to extract said second phase difference $\Delta_2$.

10. The antenna system of claim 3, wherein said CWG is a cylindrical waveguide comprising four feed probes, and wherein said second omnidirectional antenna further comprises a guiding member configured to guide said reference signal received from said second omnidirectional antenna, wherein a part of said guiding member is coaxially inserted through said upper waveguide funnel portion of said biconical horn antenna and through said CWG.

11. The antenna system of claim 10, wherein said antenna system further comprises a feed assembly, wherein said feed assembly is based upon at least one of: rectangular waveguide technology, coaxial waveguide technology, stripline technology, microstrip technology, coplanar waveguide technology, or slotline technology, wherein said feed assembly is configured to enable extracting said phase differences $\Delta_1$ and $\Delta_2$, wherein said four feed probes of said CWG are operatively connected to said feed assembly, and wherein said feed assembly comprises two output ports: a first output port and a second output port, wherein said first output port provides a first output signal of a first phase that includes two phase components: a first phase component that is proportional to the azimuth angle of said arriving signal said first component is of a first-order having a positive phase-slope and a second phase component corresponding to the elevation angle of the arriving signal, wherein said phase of said first output signal is used to extract said first phase difference $\Delta_1$, and said second output port provides a second output signal of a second phase said second phase includes two phase components: a first phase component proportional to the azimuth angle of the arriving signal said first component is of a first-order having a negative phase-slope and a second phase component corresponding to the elevation angle of the arriving signal, wherein said phase of said second output signal is used to extract said second phase difference $\Delta_2$.

12. The antenna system of claim 11, wherein said feed assembly comprises a printed board and four coaxial transmission lines, wherein said printed board is based upon at least one of: stripline technology, microstrip technology, coplanar waveguide technology, or slotline technology, and wherein said printed board comprises four inputs, wherein said four feed probes of said CWG are configured to operatively connect to said printed board inputs via said four coaxial transmission lines.

13. The antenna system of claim 12, wherein said printed board comprises: two printed 180° differential phase-shifters, a first set of four printed waveguides of equal length, two printed combiners said combiners each have two inputs and one output, a second set of two printed waveguides of equal length and a printed quadrature hybrid coupler, wherein a pair of opposing feed probes of said CWG are configured to operatively connect to the two inputs of one of said combiners via two of said coaxial transmission lines and via one of said 180° differential phase shifters and via two printed waveguides of said first set, and the two outputs of said two combiners are configured to operatively connect to the two inputs of said printed hybrid coupler via said second set of two printed transmission lines, wherein said hybrid coupler is configured to output said first and second output signals.

14. The antenna system of claim 1, wherein said first omnidirectional antenna comprises a multimodal omnidirectional antenna configured to output only two signals: a first output signal provided at port +1 corresponding to the first-order positive-slope circular-phase-mode, and a second output signal provided at port −1 corresponding to the first-order negative-slope circular-phase-mode, wherein the phase of the first output signal is proportional to the azimuth angle of said arriving signal and is of slope "plus one" and the phase of the second output signal is proportional to the azimuth angle of said arriving signal and is of slope "minus one", wherein said multimodal omnidirectional antenna is not configured to output a signal of a constant phase and of zero phase-slope said constant phase is independent of the azimuth angle of said arriving signal and corresponds to the zero-order circular-phase-mode.

15. The antenna system of claim 1, wherein said first omnidirectional antenna comprises a multimodal omnidirectional antenna transforming said arriving signal into at least three output signals wherein said output signals are of the following four signals: a first output signal provided at port +1 corresponding to the first-order positive-slope circular-phase-mode, a second output signal provided at port −1 corresponding to the first-order negative-slope circular-phase-mode, a third output signal provided at port +2 corresponding to the second-order positive-slope circular-phase-mode and a fourth output signal provided at port −2 corresponding to the second-order negative-slope circular-phase-mode, wherein the phase of the first output signal is proportional to the azimuth angle of said arriving signal and is of slope "plus one" and the phase of the second output signal is proportional to the azimuth angle of said arriving signal and is of slope "minus one" and the phase of the third output signal is proportional to the azimuth angle of said arriving signal and is of slope "plus two" and the phase of the fourth output signal is proportional to the azimuth angle of said arriving signal and is of slope "minus two", wherein at least two of said output signals are of the same order and at least one output signal corresponds to a first-order circular-phase-mode, wherein said multimodal omnidirectional antenna is not configured to output a signal of a constant phase and of zero-phase-slope said constant phase is independent of the azimuth angle of said arriving signal and corresponds to the zero-order circular-phase-mode.

16. The antenna system of claim 15, wherein said first omnidirectional antenna comprises a biconical horn antenna including two radial plates, an upper plate and a lower plate, wherein said upper plate is coaxially located above said lower plate, about said vertical axis, and wherein said upper plate comprises an upper waveguide funnel portion and said lower plate comprises a lower waveguide funnel portion, and wherein said lower waveguide funnel portion integrally connects to a circular waveguide (CWG) configured to guide the $TE_{11}$ and $TE_{21}$ circular-waveguide-modes received from said biconical-horn-antenna, wherein said CWG is of a diameter configured to filter out propagation of higher order circular-waveguide-modes and wherein said CWG comprises eight output ports and wherein said antenna system further comprises a printed board feed assembly that receives eight input signals from said eight output ports of said CWG and output said at least three output signals, in which at least two signals are of the same order and at least one signal is of a first-order, and wherein said second omnidirectional antenna further comprises a guiding member configured to guide said reference signal received from said second omnidirectional antenna and wherein a part of said guiding member is coaxially inserted through said upper waveguide funnel portion of said biconical-horn-antenna and through said CWG.

17. The antenna system of claim 1, wherein said first omnidirectional antenna comprises a continuous multimodal and omnidirectional antenna.

18. The antenna system of claim 1, wherein said first omnidirectional antenna comprises a discrete multimodal and omnidirectional antenna, wherein said discrete multimodal and omnidirectional antenna comprises a circular-antenna-array, wherein said circular-antenna-array comprises one of: a plurality of dipole antennas; a plurality of monopole antennas; a plurality of patch antennas; a plurality of tapered slotline antennas; or a plurality of horn antennas.

19. The antenna system of claim 18, wherein said circular-antenna-array feeds a discrete feed assembly with only two output ports corresponding to the +1 and −1 circular-array phase-modes.

20. The antenna system of claim 18, wherein said circular-antenna-array feeds a Butler matrix with only +1 and −1 circular-phase-mode ports.

21. The antenna system of claim 18, wherein said circular-antenna-array feeds a discrete feed assembly with at least three output ports wherein said output ports are of the four ports corresponding to the two first-order circular-phase-modes and the two second-order circular-phase-modes, wherein at least two output ports correspond to circular-phase-modes of the same order and at least one of said output ports is one of first-order.

22. The antenna system of claim 1, wherein said second omnidirectional antenna comprises one of: a dipole antenna, a biconical antenna or a radial parallel-plate antenna.

23. The antenna system of claim 1, wherein said second omnidirectional antenna comprises a circular-antenna-array feeding an equal N-way power-combiner wherein said equal power-combiner feeds a guiding member, wherein said circular-antenna-array comprises one of: a plurality of dipole antennas, a plurality of monopole antennas, a plurality of patch antennas, a plurality of tapered slot-line antennas or a plurality of horn antennas.

24. The antenna system of claim 1 is configured to find the DOA of one of: a wireless RF signal; or a wireless microwave signal.

25. The antenna system of claim 1 is configured to find the DOA of an acoustic signal, wherein said first omnidirectional antenna comprises an omnidirectional acoustic sensor configured to receive acoustic signals and said second omnidirectional antenna comprises an omnidirectional acoustic sensor configured to receive acoustic signals.

26. The antenna system of claim 25, wherein said acoustic sensor includes at least one microphone.

27. The antenna system of claim 1, further comprising an interferometery assembly configured to extract the phase differences $\Delta_1$ and $\Delta_2$.

28. The antenna system of claim 1, wherein first and second omnidirectional antennas consist of circular arrays of a plurality of discrete dual-polarized antenna elements, wherein each said antenna element has two ports, wherein two equal power combiners feed said dual-polarized circular-array of said second omnidirectional antenna, and two circular-phase-modes feeding networks feed said dual-polarized circular-array of said first omnidirectional antenna.

29. The antenna system of claim 1, wherein said second omnidirectional antenna comprises a wrap-around strip element feeding a printed power combiner at a plurality of points, wherein said strip element and said power combiner are printed on a common substrate.

30. The antenna system of claim 29, wherein said first omnidirectional antenna comprises a circular array of a plurality of dipoles feeding a printed Butler matrix that has a plurality of input ports and at least two output ports corresponding to at least two circular-phase-modes.

31. The antenna system of claim 30, wherein said first and second omnidirectional antennas include a polarizer for receiving one of: slant, linear or circular polarized signals.

32. The antenna system of claim 29, wherein said first omnidirectional antenna consists of a single layer wrap-around printed Butler matrix that is printed on a common substrate together with the radiating elements of said first omnidirectional antenna.

33. A method for estimating the direction of arrival (DOA) of an arriving signal, using an antenna system comprising a first omnidirectional antenna and a second omnidirectional antenna, said method comprising:
receiving an arriving signal, wherein said first omnidirectional antenna receives said arriving signal;
transforming said received signal into at least two output signals: a first output signal and a second output signal,
wherein the phases of said at least two output signals correspond to the azimuth and elevation angles of said arriving signal,
wherein said transformation is carried out by the first omnidirectional antenna, which is located coaxially in relation to said second omnidirectional antenna and separated therefrom at a predefined distance D;
receiving the same arriving signal, by said second omnidirectional antenna;
transforming the signal received by said second omnidirectional antenna into a reference signal of a reference phase;
said antenna system outputting at least two phase differences: a first phase difference $\Delta_1$ between the phase of said first output signal and the phase of the reference signal and a second phase difference $\Delta_2$ between the phase of said second output signal and the phase of the reference signal,
wherein each said phase difference includes a first phase component proportional to the azimuth angle of said arriving signal and a second phase component corresponding to the elevation angle of said arriving signal; and
estimating the azimuth and elevation angles of said arriving signal using said at least two phase differences $\Delta_1$ and $\Delta_2$.

34. The method of claim 33, wherein said first output signal is a signal of a first-order having a positive phase-slope and said second output signal is a signal of a first-order having a negative phase-slope, wherein said first phase difference $\Delta_1$ is proportional to: $\phi+\beta_1$ wherein $\phi$ is proportional to the azimuth angle of the arriving signal and $\beta_1$ is the elevation contribution of the arriving signal, and said second phase difference $\beta_2$ is proportional to $(-\phi+\beta_1)$, and
wherein the elevation contribution $\beta_{DOA}$ is extracted by the calculation of:

$$\beta_{DOA} = \tfrac{1}{2} \times (\Delta_1 + \Delta_2)$$

and once the elevation contribution $\beta_{DOA}$ is extracted, the azimuth $\phi_{DOA}$ is extracted by the results of the calculations of:

$$\phi_{DOA,1} = (\Delta_1 - \beta_{DOA});$$

$$\phi_{DOA,2} = -(\Delta_2 - \beta_{DOA}).$$

35. The method of claim 33, wherein said at least two output signals are of the following four signals: a signal of a first-order having a positive phase-slope; a signal of a first-order having a negative phase-slope; a signal of a second-order having a positive phase-slope; a signal of a second-order having a negative phase-slope, wherein at least two of the output signals are of the same order and at least one signal is of first-order.

36. The method of claim 35, wherein said first output signal is a signal of a first-order having a positive phase-slope and said second output signal is a signal of a second-order having a positive phase-slope and a third output signal is a signal of second-order having a negative phase-slope, wherein said first phase difference $\Delta_1$ is proportional to: $(\phi+\beta_1)$ wherein $\phi$ is proportional to the azimuth angle of the arriving signal and $\beta_1$ is the first-order elevation contribution of the arriving signal, and said second phase difference $\Delta_2$ is proportional to $(2\phi+\beta_2)$, wherein $\beta_2$ is the second-order elevation contribution of the arriving signal and a third phase difference $\Delta_3$ is proportional to $(-2\phi+\beta_2)$,
wherein the second elevation contribution $\beta_{DOA,2}$ is extracted by the calculation of:

$$\beta_{DOA,2}=\tfrac{1}{2}\times(\Delta_2+\Delta_3)$$

and the first elevation contribution $\beta_{DOA,1}$ is extracted by one of the calculations of:

$$\beta_{DOA,1}=\tfrac{1}{2}\times(2\times\Delta_1+\Delta_3-\beta_{DOA,2}),$$

$$\beta_{DOA,1}=\tfrac{1}{2}\times(2\times\Delta_1-\Delta_2+\beta_{DOA,2}),$$

wherein the elevation result $\beta_{DOA}$ is extracted from the $\beta_{DOA,1}$ and $\beta_{DOA,2}$ results,
wherein the first azimuth result $\phi_{DOA,1}$ is extracted by the calculation of:

$$\phi_{DOA,1}=(\Delta_1-\beta_{DOA,1});$$

and the second azimuth result $\phi_{DOA,2}$ is extracted by one of the calculations of:

$$\phi_{DOA,2}=\tfrac{1}{2}\times(\Delta_2-\beta_{DOA,2})$$

$$\phi_{DOA,2}=-\tfrac{1}{2}\times(\Delta_3-\beta_{DOA,2}),$$

wherein the azimuth result $\phi_{DOA}$ is extracted from the $\phi_{DOA,1}$ and $\phi_{DOA,2}$ results.

37. The method of claim 35, wherein said first output signal is a signal of a first-order having a negative phase-slope and said second output signal is a signal of a second-order having a positive phase-slope and a third output signal is a signal of second-order having a negative phase-slope,
wherein said first phase difference $\Delta_1$ is proportional to: $(-\phi+\beta_1)$ wherein $\phi$ is proportional to the azimuth of the arriving signal and $\beta_1$ is the first-order elevation contribution of the arriving signal, and said second phase difference $\Delta_2$ is proportional to $(2\phi+\beta_2)$, wherein $\beta_2$ is the second-order elevation contribution of the arriving signal and a third phase difference $\beta_3$ is proportional to $(-2\phi+\beta_2)$, wherein the second elevation contribution $\beta_{DOA,2}$ is extracted by the calculation of:

$$\beta_{DOA,2}=\tfrac{1}{2}\times(\Delta_2+\Delta_3)$$

and the first elevation contribution $\beta_{DOA,1}$ is extracted by one of the calculations of:
$$\beta_{DOA,1}=\tfrac{1}{2}\times(2\times\Delta_1+\Delta_2-\beta_{DOA,2})$$

$$\beta_{DOA,1}=\tfrac{1}{2}\times(2\times\Delta_1-\Delta_3+\beta_{DOA,2}),$$

wherein the elevation result $\beta_{DOA}$ is extracted from the $\beta_{DOA,1}$ and $\beta_{DOA,2}$ results,
wherein the first azimuth result $\phi_{DOA,1}$ is extracted by the calculation of:

$$\phi_{DOA,1}=-(\Delta_1-\beta_{DOA,1});$$

and the second azimuth result $\phi_{DOA,2}$ is extracted by one of the calculations of:

$$\phi_{DOA,2}=\tfrac{1}{2}\times(\Delta_2-\beta_{DOA,2})$$

$$\phi_{DOA,2}=-\tfrac{1}{2}\times(\Delta_3-\beta_{DOA,2}),$$

wherein the azimuth result $\phi_{DOA}$ is extracted from the $\phi_{DOA,1}$ and $\phi_{DOA,2}$ results.

38. The method of claim 35, wherein said first output signal is a signal of a first-order having a positive phase-slope and said second output signal is a signal of a first-order having a negative phase-slope and a third output signal is a signal of second-order having a positive phase-slope,
wherein said first phase difference $\Delta_1$ is proportional to: $(\phi+\beta_1)$ wherein $\phi$ is proportional to the azimuth angle of the arriving signal and $\beta_1$ is the first-order elevation contribution of the arriving signal, and said second phase difference $\Delta_2$ is proportional to $(-\phi+\beta_1)$, and a third phase difference $\Delta_3$ is proportional to $(2\phi+\beta_2)$ wherein $\beta_2$ is the second-order elevation contribution of the arriving signal,
wherein the first elevation contribution $\beta_{DOA,1}$ is extracted by the calculation of:

$$\beta_{DOA,1}=\tfrac{1}{2}\times(\Delta_1+\Delta_2)$$

and the second elevation contribution $\beta_{DOA,2}$ is extracted by one of the calculations of:

$$\beta_{DOA,2}=-(2\times\Delta_1-\Delta_3-2\times\beta_{DOA,1})$$

$$\beta_{DOA,2}=(2\times\Delta_2+\Delta_3-2\times\beta_{DOA,1})$$

wherein the elevation result $\beta_{DOA}$ is extracted from the $\beta_{DOA,1}$ and $\beta_{DOA,2}$ results
wherein the first azimuth result $\phi_{DOA,1}$ is extracted by the calculation of:

$$\phi_{DOA,1}=(\Delta_1-\beta_{DOA,1});$$

and the second azimuth result $\phi_{DOA,2}$ is extracted by the calculation of:

$$\phi_{DOA,2}=-(\Delta_2-\beta_{DOA,1});$$

and the third azimuth result $\phi_{DOA,3}$ is extracted by the calculation of:

$$\phi_{DOA,3}=\tfrac{1}{2}\times(\Delta_3-\beta_{DOA,2})$$

wherein the azimuth result $\phi_{DOA}$ is extracted from the $\phi_{DOA,1}$, $\phi_{DOA,2}$ and $\phi_{DOA,3}$ results.

39. The method of claim 35, wherein said first output signal is a signal of a first-order having a positive phase-slope and said second output signal is a signal of a first-order having a negative phase-slope and a third output signal is a signal of second-order having a negative phase-slope,
wherein said first phase difference $\Delta_1$ is proportional to: $(\phi+\beta_1)$ wherein $\phi$ is proportional to the azimuth angle of the arriving signal and $\beta_1$ is the first-order elevation contribution of the arriving signal, and said second phase difference $\Delta_2$ is proportional to $(-\phi+\beta_1)$, and a third phase difference $\Delta_3$ is proportional to $(-2\phi+\beta_2)$ wherein $\beta_2$ is the second-order elevation contribution of the arriving signal,
wherein the first elevation contribution $\beta_{DOA,1}$ is extracted by the calculation of:

$$\beta_{DOA,1}=\tfrac{1}{2}\times(\Delta_1+\Delta_2)$$

and the second elevation contribution $\beta_{DOA,\,2}$ is extracted by one of the calculations of:

$$\beta_{DOA,2}=(2\times\Delta_1+\Delta_3-2\times\beta_{DOA,1})$$

$$\beta_{DOA,2}=-(2\times\Delta_2-\Delta_3-2\times\beta_{DOA,1})$$

wherein the elevation result $\beta_{DOA}$ is extracted from the $\beta_{DOA,1}$ and $\beta_{DOA,2}$ results,
wherein the first azimuth result $\phi_{DOA,1}$ is extracted by the calculation of:

$$\phi_{DOA,1}=(\Delta_1-\beta_{DOA,1});$$

and the second azimuth result $\phi_{DOA,2}$ is extracted by the calculation of:

$$\phi_{DOA,2}=-(\Delta_2-\beta_{DOA,1});$$

and the third azimuth result $\phi_{DOA,3}$ is extracted by the calculation of:

$$\phi_{DOA,3}=-\tfrac{1}{2}\times(\Delta_3-\beta_{DOA,2})$$

wherein the azimuth result $\phi_{DOA}$ is extracted from the $\phi_{DOA,1}$, $\phi_{DOA,2}$ and $\phi_{DOA,3}$ results.

40. The method of claim 35, wherein said first output signal is a signal of a first-order having a positive phase-slope and said second output signal is a signal of a first-order having a negative phase-slope and a third output signal is a signal of second-order having a positive phase-slope and a fourth output signal is a signal of second-order having a negative phase-slope wherein said first phase difference $\Delta_1$ is proportional to: $(\phi+\beta_1)$ wherein $\phi$ is proportional to the azimuth angle of the arriving signal and $\beta_1$ is the first-order elevation contribution of the arriving signal, and said second phase difference $\Delta_2$ is proportional to $(-\phi+\beta_1)$, and a third phase difference $\Delta_3$ is proportional to $(2\phi+\beta_2)$ wherein $\beta_2$ is the second-order elevation contribution of the arriving signal, and a fourth phase difference $\Delta_4$ is proportional to $(-2\phi+\beta_2)$, wherein the first elevation contribution $\beta_{DOA,1}$ is extracted by the calculation of:

$\beta_{DOA,1}=\frac{1}{2}\times(\Delta_1+\Delta_2)$, and the second elevation contribution $\beta_{DOA,2}$ is extracted by the calculation of:

$\beta_{DOA,2}=\frac{1}{2}\times(\Delta_3+\Delta_4)$, wherein the elevation result $\phi_{DOA}$ is extracted from the $\beta_{DOA,1}$ and $\beta_{DOA,2}$ results, wherein the first azimuth result $\phi_{DOA,1}$ is extracted by the calculation of:

$\phi_{DOA,1}=(\Delta_1-\beta_{DOA,1})$;

and the second azimuth result $\phi_{DOA,2}$ is extracted by the calculation of:

$\phi_{DOA,2}=-(\Delta_2-\beta_{DOA,1})$;

and the third azimuth result $\phi_{DOA,3}$ is extracted by the calculation of:

$\phi_{DOA,3}=\frac{1}{2}\times(\Delta_3-\beta_{DOA,2})$, and the fourth azimuth result $\phi_{DOA,4}$ is extracted by the calculation of:

$\phi_{DOA,4}=-\frac{1}{2}\times(\Delta_4-\beta_{DOA,2})$, wherein the azimuth result $\phi_{DOA}$ is extracted from the $\phi_{DOA,1}$, $\phi_{DOA,2}$, $\phi_{DOA,3}$ and $\phi_{DOA,4}$ results.

* * * * *